United States Patent
Sobecki et al.

(10) Patent No.: US 12,342,106 B2
(45) Date of Patent: Jun. 24, 2025

(54) VEHICULAR DRIVER MONITORING SYSTEM

(71) Applicant: Magna Mirrors of America, Inc., Holland, MI (US)

(72) Inventors: Justin E. Sobecki, Rockford, MI (US); Austen C. Peterson, Hudsonville, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 98 days.

(21) Appl. No.: 18/544,493

(22) Filed: Dec. 19, 2023

(65) Prior Publication Data
US 2024/0223734 A1 Jul. 4, 2024

Related U.S. Application Data

(60) Provisional application No. 63/482,087, filed on Jan. 30, 2023, provisional application No. 63/478,152, filed on Jan. 1, 2023.

(51) Int. Cl.
*H04N 7/18* (2006.01)
*B60R 1/04* (2006.01)
(Continued)

(52) U.S. Cl.
CPC .............. *H04N 7/183* (2013.01); *B60R 1/04* (2013.01); *B60R 1/088* (2013.01); *B60R 1/12* (2013.01);
(Continued)

(58) Field of Classification Search
CPC .......... H04N 7/183; H04N 23/57; B60R 1/04; B60R 1/088; B60R 1/12; B60R 1/1207;
(Continued)

(56) References Cited

U.S. PATENT DOCUMENTS 4,546,551 A 10/1985 Franks
4,953,305 A 9/1990 Van Lente et al.
(Continued)

FOREIGN PATENT DOCUMENTS

CN 205523966 U 8/2016
CN 209534893 U 10/2019
(Continued)

OTHER PUBLICATIONS

Seeing Machines' FOVIO Driver Monitoring (FDM) processor [description of which is available at https://china.xilinx.com/publications/presentations/c_D3_03-Driver-Monitoring-Systems.pdf], Jan. 14, 2021.

*Primary Examiner* — James M Pontius
(74) *Attorney, Agent, or Firm* — HONIGMAN LLP

(57) ABSTRACT

A vehicular driver monitoring system includes an interior rearview mirror assembly including a mirror head and a mirror reflective element, a driver monitoring camera and a video mirror display screen accommodated by the mirror head and that move together and in tandem with the mirror head. The video mirror display screen displays video images viewable through the mirror reflective element. A sensing device generates sensor data representative of an orientation of the mirror head relative to mounting structure and the system determines orientation of the mirror head relative to the mounting structure. Image data captured by the driver monitoring camera is processed based on the determined orientation of the mirror head for monitoring of the driver of the vehicle. Responsive to adjustment of the mirror head relative to the mounting structure, video images displayed by the display screen are adjusted based on the determined orientation of the mirror head.

47 Claims, 12 Drawing Sheets

(51) Int. Cl.
*B60R 1/08* (2006.01)
*B60R 1/12* (2006.01)
*B60R 1/20* (2022.01)
*H04N 23/57* (2023.01)

(52) U.S. Cl.
CPC .............. *B60R 1/1207* (2013.01); *B60R 1/20* (2022.01); *H04N 23/57* (2023.01); *B60R 2001/1223* (2013.01); *B60R 2001/1253* (2013.01); *B60R 2300/30* (2013.01)

(58) Field of Classification Search
CPC .............. B60R 1/20; B60R 2001/1223; B60R 2001/1253; B60R 2300/30
See application file for complete search history.

(56) References Cited

U.S. PATENT DOCUMENTS

| | | | |
|---|---|---|---|
| 5,530,240 A | 6/1996 | Larson et al. | |
| 5,550,677 A | 8/1996 | Schofield et al. | |
| 5,567,360 A | 10/1996 | Varaprasad et al. | |
| 5,570,127 A | 10/1996 | Schmidt | |
| 5,576,687 A | 11/1996 | Blank et al. | |
| 5,632,092 A | 5/1997 | Blank et al. | |
| 5,668,663 A | 9/1997 | Varaprasad et al. | |
| 5,670,935 A | 9/1997 | Schofield et al. | |
| 5,699,044 A | 12/1997 | Van Lente et al. | |
| 5,708,410 A | 1/1998 | Blank et al. | |
| 5,724,187 A | 3/1998 | Varaprasad et al. | |
| 5,737,226 A | 4/1998 | Olson et al. | |
| 5,760,962 A | 6/1998 | Schofield et al. | |
| 5,796,094 A | 8/1998 | Schofield et al. | |
| 5,802,727 A | 9/1998 | Blank et al. | |
| 5,877,897 A | 3/1999 | Schofield et al. | |
| 5,878,370 A | 3/1999 | Olson | |
| 6,087,953 A | 7/2000 | DeLine et al. | |
| 6,097,023 A | 8/2000 | Schofield et al. | |
| 6,158,655 A | 12/2000 | DeVries, Jr. et al. | |
| 6,173,501 B1 | 1/2001 | Blank et al. | |
| 6,222,460 B1 | 4/2001 | DeLine et al. | |
| 6,329,925 B1 | 12/2001 | Skiver et al. | |
| 6,483,438 B2 | 11/2002 | DeLine et al. | |
| 6,513,252 B1 | 2/2003 | Schierbeek et al. | |
| 6,552,342 B2 | 4/2003 | Holz et al. | |
| 6,593,565 B2 | 7/2003 | Heslin et al. | |
| 6,627,918 B2 | 9/2003 | Getz et al. | |
| 6,642,851 B2 | 11/2003 | Deline et al. | |
| 6,690,268 B2 | 2/2004 | Schofield et al. | |
| 6,698,905 B1 | 3/2004 | Whitehead | |
| 6,703,925 B2 | 3/2004 | Steffel | |
| 6,824,281 B2 | 11/2004 | Schofield et al. | |
| 7,004,593 B2 | 2/2006 | Weller et al. | |
| 7,038,577 B2 | 5/2006 | Pawlicki et al. | |
| 7,184,190 B2 | 2/2007 | McCabe et al. | |
| 7,195,381 B2 | 3/2007 | Lynam et al. | |
| 7,224,324 B2 | 5/2007 | Quist et al. | |
| 7,249,860 B2 | 7/2007 | Kulas et al. | |
| 7,253,723 B2 | 8/2007 | Lindahl et al. | |
| 7,255,451 B2 | 8/2007 | McCabe et al. | |
| 7,274,501 B2 | 9/2007 | McCabe et al. | |
| 7,289,037 B2 | 10/2007 | Uken et al. | |
| 7,308,341 B2 | 12/2007 | Schofield et al. | |
| 7,329,013 B2 | 2/2008 | Blank et al. | |
| 7,338,177 B2 | 3/2008 | Lynam | |
| 7,360,932 B2 | 4/2008 | Uken et al. | |
| 7,370,983 B2 | 5/2008 | DeWind et al. | |
| 7,420,756 B2 | 9/2008 | Lynam | |
| 7,446,650 B2 | 11/2008 | Scholfield et al. | |
| 7,477,758 B2 | 1/2009 | Piirainen et al. | |
| 7,480,149 B2 | 1/2009 | DeWard et al. | |
| 7,581,859 B2 | 9/2009 | Lynam | |
| 7,626,749 B2 | 12/2009 | Baur et al. | |
| 7,720,580 B2 | 5/2010 | Higgins-Luthman | |
| 7,722,199 B2 | 5/2010 | DeWard et al. | |
| 7,855,755 B2 | 12/2010 | Weller et al. | |
| 7,914,187 B2 | 3/2011 | Higgins-Luthman et al. | |
| 8,049,640 B2 | 11/2011 | Uken et al. | |
| 8,258,932 B2 | 9/2012 | Wahlstrom | |
| 8,446,470 B2 | 5/2013 | Lu et al. | |
| 8,451,107 B2 | 5/2013 | Lu et al. | |
| 8,508,831 B2 | 8/2013 | De Wind et al. | |
| 8,529,108 B2 | 9/2013 | Uken et al. | |
| 8,730,553 B2 | 5/2014 | De Wind et al. | |
| 8,743,203 B2 | 6/2014 | Karner et al. | |
| 8,876,342 B2 | 11/2014 | Wimbert et al. | |
| 8,922,422 B2 | 12/2014 | Klar et al. | |
| 9,090,213 B2 | 7/2015 | Lawlor et al. | |
| 9,126,525 B2 | 9/2015 | Lynam et al. | |
| 9,174,578 B2 | 11/2015 | Uken et al. | |
| 9,280,202 B2 | 3/2016 | Gieseke et al. | |
| 9,327,648 B2 | 5/2016 | Sloterbeek et al. | |
| 9,346,403 B2 | 5/2016 | Uken et al. | |
| 9,405,120 B2 | 8/2016 | Graf et al. | |
| 9,487,159 B2 | 11/2016 | Achenbach | |
| 9,493,122 B2 | 11/2016 | Krebs | |
| 9,598,016 B2 | 3/2017 | Blank et al. | |
| 9,609,757 B2 | 3/2017 | Steigerwald | |
| 9,616,815 B2 | 4/2017 | Mohan | |
| 9,701,258 B2 | 7/2017 | Tiryaki | |
| 9,827,913 B2 | 11/2017 | De Wind et al. | |
| 9,878,669 B2 | 1/2018 | Kendall | |
| 9,900,490 B2 | 2/2018 | Ihlenburg et al. | |
| 9,948,832 B2* | 4/2018 | Laroia | H04N 23/951 |
| 10,017,114 B2 | 7/2018 | Bongwald | |
| 10,029,614 B2 | 7/2018 | Larson | |
| 10,046,706 B2 | 8/2018 | Larson et al. | |
| 10,065,574 B2 | 9/2018 | Tiryaki | |
| 10,071,687 B2 | 9/2018 | Ihlenburg et al. | |
| 10,099,614 B2 | 10/2018 | Diessner | |
| 10,166,924 B2 | 1/2019 | Baur | |
| 10,166,926 B2 | 1/2019 | Krebs et al. | |
| 10,247,941 B2 | 4/2019 | Fursich | |
| 10,261,648 B2 | 4/2019 | Uken et al. | |
| 10,264,219 B2 | 4/2019 | Mleczko et al. | |
| 10,315,573 B2 | 6/2019 | Bongwald | |
| 10,421,404 B2 | 9/2019 | Larson et al. | |
| 10,442,360 B2 | 10/2019 | LaCross et al. | |
| 10,466,563 B2 | 11/2019 | Kendall et al. | |
| 10,567,633 B2 | 2/2020 | Ihlenburg et al. | |
| 10,567,705 B2 | 2/2020 | Ziegenspeck et al. | |
| 10,703,204 B2 | 7/2020 | Hassan et al. | |
| 10,769,434 B2 | 9/2020 | Weller et al. | |
| 10,906,463 B2 | 2/2021 | Pflug et al. | |
| 10,908,417 B2 | 2/2021 | Fürsich | |
| 10,922,563 B2 | 2/2021 | Nix et al. | |
| 10,946,798 B2 | 3/2021 | Fürsich et al. | |
| 10,958,830 B2 | 3/2021 | Koravadi | |
| 11,167,771 B2 | 11/2021 | Caron et al. | |
| 11,205,083 B2 | 12/2021 | Lynam | |
| 11,214,199 B2 | 1/2022 | LaCross et al. | |
| 11,240,427 B2 | 2/2022 | Koravadi | |
| 11,242,008 B2 | 2/2022 | Blank et al. | |
| 11,252,376 B2 | 2/2022 | Ihlenburg | |
| 11,292,389 B2 | 4/2022 | LaCross et al. | |
| 11,341,671 B2 | 5/2022 | Lu et al. | |
| 11,348,374 B2 | 5/2022 | Kramer et al. | |
| 11,433,906 B2 | 9/2022 | Lu | |
| 11,465,561 B2 | 10/2022 | Peterson et al. | |
| 11,488,399 B2 | 11/2022 | Wacquant | |
| 11,493,918 B2 | 11/2022 | Singh | |
| 11,518,401 B2 | 12/2022 | Kulkarni | |
| 11,582,425 B2 | 2/2023 | Liu | |
| 11,639,134 B1 | 5/2023 | Huizen et al. | |
| 11,691,567 B2 | 7/2023 | Huizen et al. | |
| 11,780,370 B2 | 10/2023 | Peterson et al. | |
| 11,780,372 B2 | 10/2023 | Sobecki et al. | |
| 11,827,153 B2 | 11/2023 | Miller et al. | |
| 12,214,720 B2* | 2/2025 | Sobecki | G03B 21/2033 |
| 2001/0022550 A1 | 9/2001 | Steffel | |
| 2002/0005999 A1 | 1/2002 | Hutzel et al. | |
| 2002/0024713 A1 | 2/2002 | Roberts et al. | |
| 2004/0252993 A1 | 12/2004 | Sato | |
| 2006/0050018 A1 | 3/2006 | Hutzel et al. | |
| 2006/0061008 A1 | 3/2006 | Karner et al. | |

(56) References Cited

U.S. PATENT DOCUMENTS

| | | |
|---|---|---|
| 2007/0182528 A1 | 8/2007 | Breed et al. |
| 2008/0310005 A1 | 12/2008 | Tonar et al. |
| 2009/0040306 A1* | 2/2009 | Foote .................. B60R 1/062 |
| | | 348/148 |
| 2009/0040778 A1 | 2/2009 | Takayanagi et al. |
| 2009/0135493 A1 | 5/2009 | Takayanagi et al. |
| 2010/0020170 A1 | 1/2010 | Higgins-Luthman et al. |
| 2010/0085653 A1 | 4/2010 | Uken et al. |
| 2010/0253526 A1 | 10/2010 | Szczerba et al. |
| 2011/0080481 A1 | 4/2011 | Bellingham |
| 2011/0188122 A1 | 8/2011 | Habibi et al. |
| 2012/0162427 A1 | 6/2012 | Lynam |
| 2012/0162430 A1* | 6/2012 | Heslin .................. B60R 1/12 |
| | | 348/148 |
| 2012/0236136 A1 | 9/2012 | Boddy |
| 2014/0022390 A1 | 1/2014 | Blank et al. |
| 2014/0285666 A1 | 9/2014 | O'Connell et al. |
| 2014/0293169 A1 | 10/2014 | Uken et al. |
| 2014/0313563 A1 | 10/2014 | Uken et al. |
| 2014/0336876 A1 | 11/2014 | Gieseke et al. |
| 2015/0009010 A1 | 1/2015 | Biemer |
| 2015/0015710 A1 | 1/2015 | Tiryaki |
| 2015/0022664 A1 | 1/2015 | Pflug et al. |
| 2015/0092042 A1 | 4/2015 | Fursich |
| 2015/0097955 A1 | 4/2015 | De Wind et al. |
| 2015/0232030 A1 | 8/2015 | Bongwald |
| 2015/0294169 A1 | 10/2015 | Zhou et al. |
| 2015/0296135 A1 | 10/2015 | Wacquant et al. |
| 2015/0352953 A1 | 12/2015 | Koravadi |
| 2016/0137126 A1 | 5/2016 | Fursich et al. |
| 2016/0209647 A1 | 7/2016 | Fursich |
| 2016/0221509 A1 | 8/2016 | Takada et al. |
| 2017/0217367 A1 | 8/2017 | Pflug et al. |
| 2017/0237946 A1 | 8/2017 | Schofield et al. |
| 2017/0274906 A1 | 9/2017 | Hassan et al. |
| 2017/0355312 A1 | 12/2017 | Habibi et al. |
| 2018/0134217 A1 | 5/2018 | Peterson et al. |
| 2018/0222414 A1 | 8/2018 | Ihlenburg et al. |
| 2018/0231976 A1 | 8/2018 | Singh |
| 2019/0054899 A1 | 2/2019 | Hoyos et al. |
| 2019/0118717 A1 | 4/2019 | Blank et al. |
| 2019/0146297 A1 | 5/2019 | Lynam et al. |
| 2019/0168669 A1 | 6/2019 | Lintz et al. |
| 2019/0210615 A1 | 7/2019 | Caron et al. |
| 2019/0258131 A9 | 8/2019 | Lynam et al. |
| 2019/0364199 A1 | 11/2019 | Koravadi |
| 2019/0381938 A1 | 12/2019 | Hopkins |
| 2020/0143560 A1 | 5/2020 | Lu et al. |
| 2020/0148120 A1 | 5/2020 | Englander et al. |
| 2020/0202151 A1 | 6/2020 | Wacquant |
| 2020/0320320 A1 | 10/2020 | Lynam |
| 2020/0327323 A1 | 10/2020 | Noble |
| 2020/0377022 A1 | 12/2020 | LaCross et al. |
| 2021/0056306 A1 | 2/2021 | Hu et al. |
| 2021/0122404 A1 | 4/2021 | Lisseman et al. |
| 2021/0155167 A1 | 5/2021 | Lynam et al. |
| 2021/0162926 A1 | 6/2021 | Lu |
| 2021/0245662 A1 | 8/2021 | Blank et al. |
| 2021/0291739 A1 | 9/2021 | Kasarla et al. |
| 2021/0306538 A1 | 9/2021 | Solar |
| 2021/0323473 A1 | 10/2021 | Peterson et al. |
| 2021/0323477 A1 | 10/2021 | LaCross et al. |
| 2021/0368082 A1 | 11/2021 | Solar |
| 2022/0111857 A1 | 4/2022 | Kulkarni |
| 2022/0161724 A1* | 5/2022 | Slama .................. H04N 7/183 |
| 2022/0229309 A1 | 7/2022 | Laskin et al. |
| 2022/0242438 A1 | 8/2022 | Sobecki et al. |
| 2022/0254132 A1* | 8/2022 | Rother .................. B60R 1/12 |
| 2022/0377219 A1 | 11/2022 | Conger et al. |
| 2023/0131471 A1 | 4/2023 | Sobecki et al. |
| 2023/0137004 A1 | 5/2023 | Huizen et al. |
| 2023/0302994 A1 | 9/2023 | Miller et al. |
| 2024/0017610 A1 | 1/2024 | Ravichandran et al. |
| 2024/0064274 A1 | 2/2024 | Blank et al. |
| 2024/0217437 A1 | 7/2024 | LaCross |
| 2024/0282069 A1* | 8/2024 | Rother .................. G03B 17/561 |

FOREIGN PATENT DOCUMENTS

| | | |
|---|---|---|
| DE | 19937021 A1 | 3/2001 |
| DE | 10325646 A1 | 1/2004 |
| DE | 102005000650 A1 | 7/2006 |
| DE | 102018123159 A1 | 3/2019 |
| DE | 102021203783 A1 | 10/2021 |
| FR | 3071788 A1 | 4/2019 |
| JP | 2004136760 A | 5/2004 |
| WO | 2023220222 A1 | 11/2023 |

* cited by examiner

VEHICULAR DRIVER MONITORING SYSTEM

CROSS REFERENCE TO RELATED APPLICATIONS

The present application claims priority of U.S. provisional application Ser. No. 63/482,087, filed Jan. 30, 2023, and U.S. provisional application Ser. No. 63/478,152, filed Jan. 1, 2023, which are hereby incorporated herein by reference in their entireties.

FIELD OF THE INVENTION

The present invention relates generally to a vehicular driver or occupant or cabin monitoring system for a vehicle and, more particularly, to a vehicular driver or occupant or cabin monitoring system that utilizes one or more cameras at an interior mirror of a vehicle.

BACKGROUND OF THE INVENTION

It is known to provide a mirror assembly that is adjustably mounted to an interior portion of a vehicle, such as via a single or double ball pivot or joint mounting configuration where the mirror casing and mirror reflective element are adjusted relative to the interior portion of a vehicle by pivotal movement about the single or double ball pivot configuration. The mirror casing and reflective element are pivotable about one or two ball pivot joints by a user that is adjusting a rearward field of view of the reflective element.

SUMMARY OF THE INVENTION

A vehicular driver monitoring system or driving assist system or imaging system for a vehicle utilizes one or more cameras (preferably one or more CMOS cameras) to capture image data. The system may include an interior rearview mirror assembly having a mirror head adjustably attached at a mounting structure or base. The mounting structure is configured to attach at an interior portion of a vehicle. The mirror head includes a mirror reflective element. A driver monitoring camera is accommodated by the mirror head and moves with the mirror head when the mirror head is adjusted by the driver of the vehicle to adjust his or her rearward view. A light emitter may be accommodated by the mirror head and operable, when electrically powered to emit light, to emit near infrared (NIR) light. An electronic control unit (ECU) comprises electronic circuitry and associated software, and the electronic circuitry of the ECU comprises an image processor for processing image data captured by the camera. The mirror assembly includes a magnetic sensing device that operates to determine the location or position or orientation of the mirror head relative to the mounting structure, and the system, responsive to output of the magnetic sensing device, determines orientation of the mirror head relative to the mounting structure and location or position and viewing angle of the camera. With the mounting structure attached at the interior portion of the vehicle, image data captured by the camera is processed at the ECU for an occupant monitoring function or a driver monitoring function, and the image processing at the ECU of captured image data is based at least in part on the determined location or position and viewing angle of the camera.

In some examples, a video mirror display screen is disposed at the interior rearview mirror assembly and, when electrically operated, displays video images that are viewable through the mirror reflective element by the driver of the vehicle. The video mirror display screen displays video images representative of the rearward view provided by the mirror reflective element. The system determines an angle of the mirror reflective element relative to the driver of the vehicle responsive to determination of the orientation of the mirror head relative to the mounting structure and processing of image data captured by the camera. Responsive to adjustment of the angle of the mirror reflective element relative to the driver, the video images displayed by the video mirror display screen are adjusted.

These and other objects, advantages, purposes and features of the present invention will become apparent upon review of the following specification in conjunction with the drawings.

DESCRIPTION OF THE PREFERRED EMBODIMENTS

Figure 1:
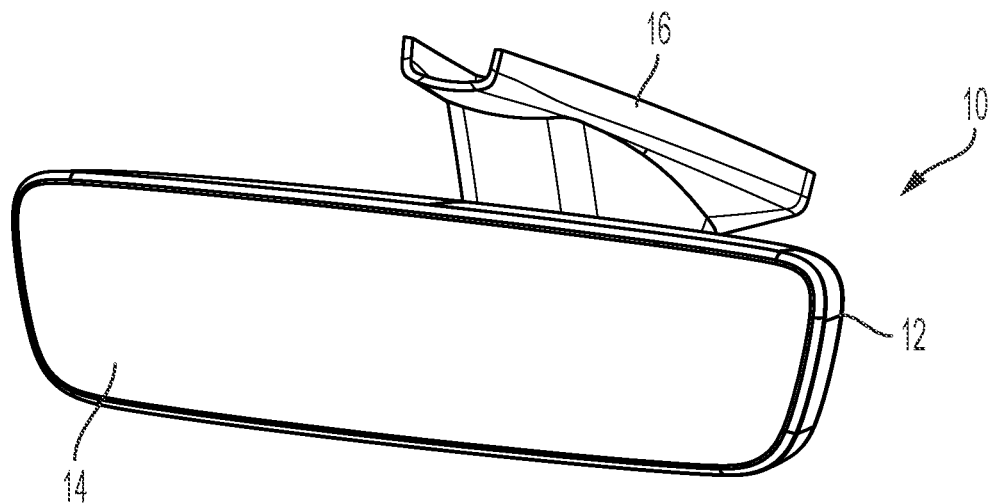
FIG. 1 is a perspective view of an interior rearview mirror assembly having a driver monitoring camera and a near infrared light emitter behind a reflective element of the interior rearview mirror assembly.

Referring now to the drawings and the illustrative embodiments depicted therein, an interior rearview mirror assembly 10 for a vehicle includes a casing 12 and a reflective element 14 positioned at a front portion of the casing 12 (FIG. 1). In the illustrated embodiment, the mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly or stay 16. The system includes a camera 18 disposed at and movable with the mirror head. For example, the camera 18 may be disposed behind the mirror reflective element 14 and view through the mirror reflective element 14 for capturing image data representative of the interior cabin of the vehicle, including the driver's head region and occupant region of the vehicle cabin. The system may utilize aspects of driver monitoring systems or occupant monitoring systems described in U.S. Publication No. US-2022-0377219 and/or International Publication Nos. WO 2023/220222; WO 2023/034956; WO 2022/241423 and/or WO 2022/187805, which are all hereby incorporated herein by reference in their entireties.

Figure 2:
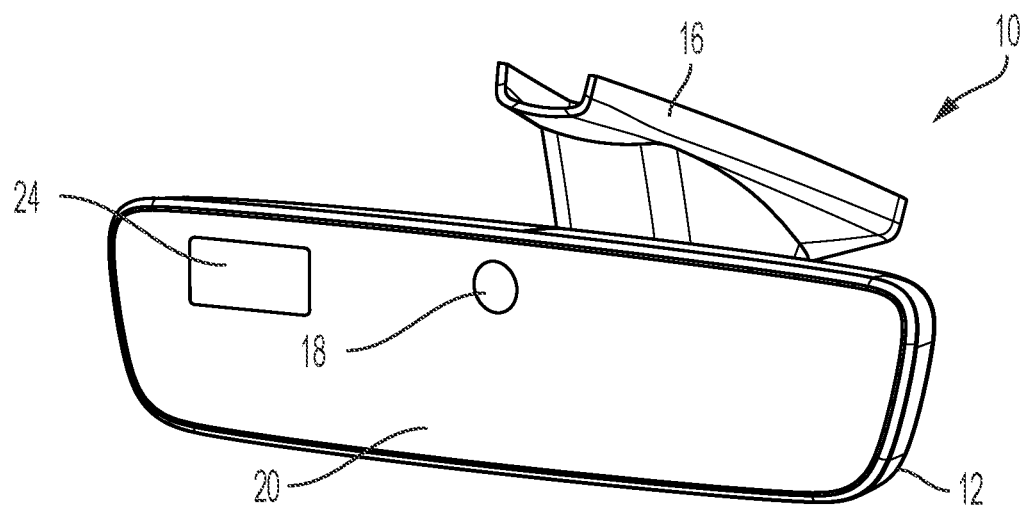
FIG. 2 is another perspective view of the interior rearview mirror assembly, showing the driver monitoring camera and light emitters without the reflective element.

The mirror assembly 10 includes or is associated with a driver monitoring system (DMS) and/or an occupant monitoring system (OMS), with the mirror assembly 10 comprising a driver/occupant monitoring camera 18 disposed at a back plate 20 (and viewing through an aperture of the back plate) behind the reflective element 14 and viewing through the reflective element 14 toward at least a head region of the driver of the vehicle (FIG. 2). That is, the driver monitoring camera 18 is accommodated by the mirror head, and with the mounting structure 16 attached at the interior portion of the cabin of the vehicle, the driver monitoring camera views within the cabin of the vehicle toward at least the head region of the driver.

The mirror assembly 10 may comprise an auto-dimming mirror reflective element (e.g., an electrochromic mirror reflective element) or a prismatic mirror reflective element. For a prismatic mirror, when the head or housing is set to a particular orientation by the driver of an equipped vehicle, a toggle operable by the driver moves the housing and reflective element to flip upward/downward, typically by about 4 degrees, to switch between a daytime or non-glare reducing position (where the driver views reflections at the mirror reflector of the mirror reflective element) and a nighttime or glare reducing position (where the driver views reflections at the surface of the glass substrate of the mirror reflective element). With the auto-dimming mirror, there is typically no movement once the mirror head is set for the particular driver. The electrochromic mirror reflective element dims responsive to an electric current applied to an electrochromic medium of the mirror reflective element.

Both types of mirrors may be provided with a video display screen that is disposed behind and is viewable through the mirror reflective element. Such video mirrors include a backlit LCD display screen, and a particular form of video mirror is a full display mirror (such a ClearView™ Interior Rearview Mirror Assembly available from Magna Mirrors of America, Inc. of Holland, MI USA, or an FDM™ Interior Rearview Mirror Assembly available from Gentex Corporation of Zeeland, MI USA), where the video display screen fills the reflective region, such as by utilizing aspects of the mirror assemblies and systems described in U.S. Pat. Nos. 11,242,008; 11,214,199; 10,442,360; 10,421,404; 10,166,924; 10,046,706 and/or 10,029,614, and/or U.S. Publication Nos. US-2021-0162926; US-2019-0258131; US-2019-0146297; US-2019-0118717 and/or US-2017-0355312, which are all hereby incorporated herein by reference in their entireties. In that type of a dual-mode interior rearview mirror, the EC mirror head moves when switching from a traditional reflection mode or mirror mode to a live-video display mode.

Figure 10:
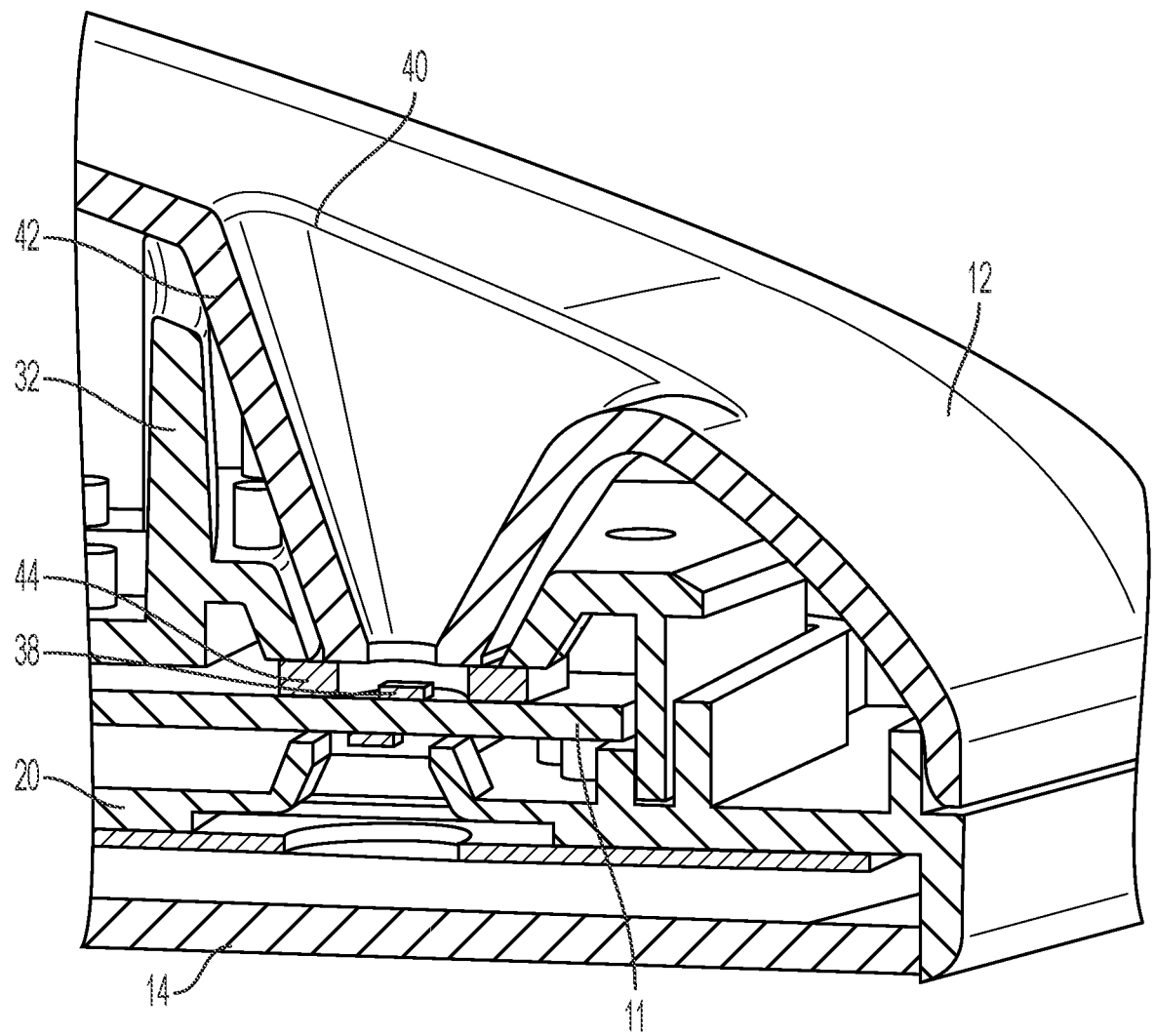
FIG. 10 is a sectional view of a portion of the interior rearview mirror assembly, showing an ambient light sensor aligned with an aperture in the mirror casing.

The mirror assembly 10 includes a printed circuit board (PCB) 11 (FIG. 10) (such as disposed at the back plate) having a control or control unit comprising electronic circuitry (e.g., disposed at the circuit board or substrate in the mirror casing), which includes driver circuitry for controlling dimming of the mirror reflective element 14. The circuit board (or a separate DMS circuit board) includes a processor that processes image data captured by the camera 18 for monitoring the driver and determining, for example, driver attentiveness and/or driver drowsiness. The driver monitoring system includes the driver monitoring camera 18 and may also include an occupant monitoring camera (or the driver monitoring camera may have a sufficiently wide field of view so as to view the occupant or passenger seat of the vehicle as well as the driver region), and may provide occupant detection and/or monitoring functions as part of an occupant monitoring system (OMS).

The DMS includes one or more infrared (IR) or near infrared (NIR) light emitter(s) 24, which may be disposed at the back plate 20 and may emit light, when electrically powered to emit light, that passes through another aperture of the back plate 20 and through the reflective element 14 to illuminate the head region of the driver of the vehicle. For example, the mirror assembly 10 may include one or more IR or NIR light emitting diodes (LEDs) or vertical-cavity surface-emitting lasers (VCSEL) or the like disposed at the back plate 20 behind the reflective element 14 and, when electrically powered to emit light, emitting near infrared light (or other nonvisible light) through the aperture of the back plate 20 and through the reflective element 14 toward the head region of the driver of the vehicle.

The interior rearview mirror 10 thus may include embedded cameras, IR/NIR illuminators and one or more processors for processing captured image data for the driver monitoring application. The inward facing camera 18 and light emitters 24 are fixed within the mirror head, and thus both components may be coupled with the mirror body. In these cases, the camera's field of view is subject to change from driver to driver as the mirror head is adjusted to set the driver's preferred rearward view provided by the mirror reflective element 14.

Figure 3:
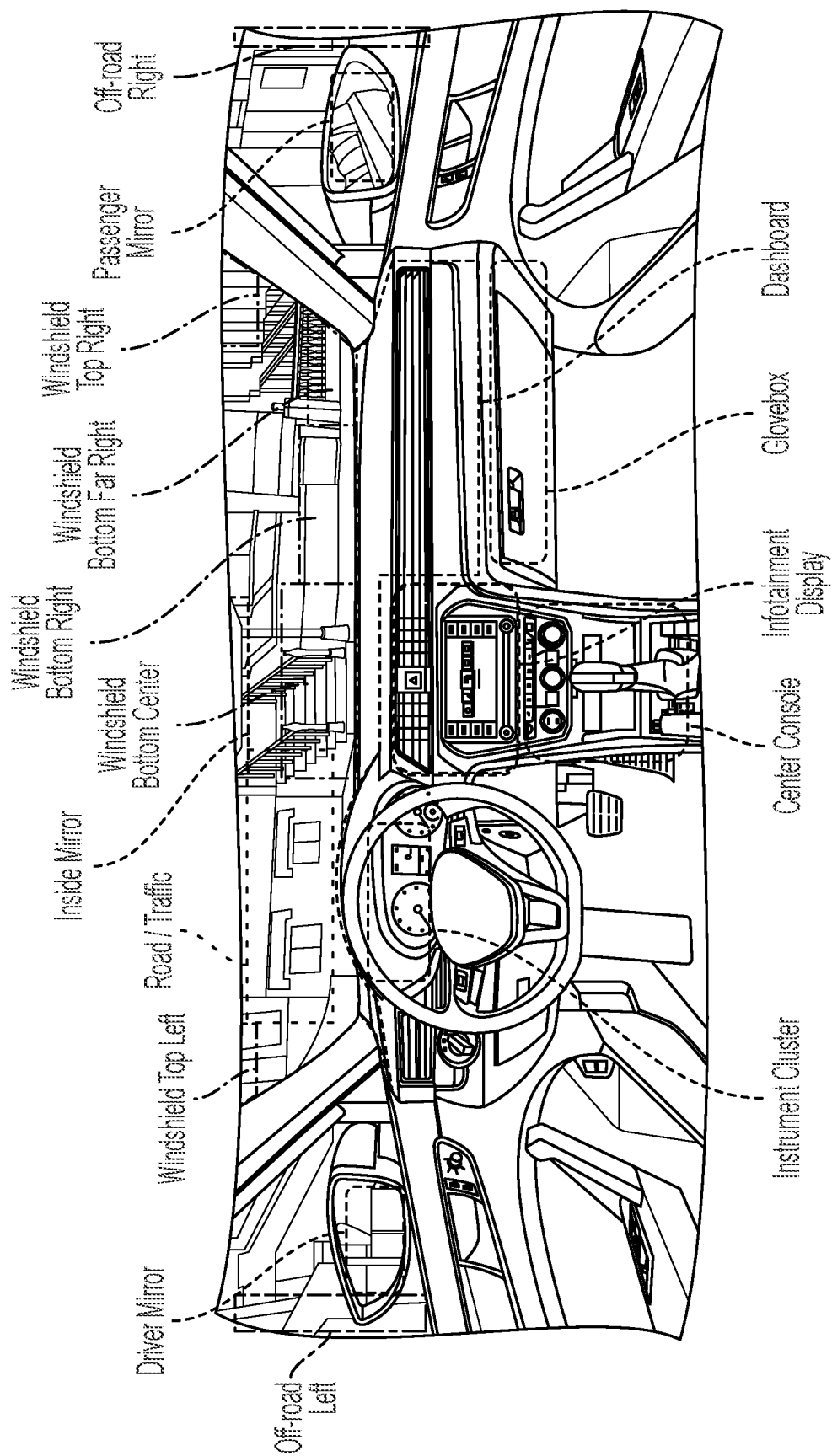
FIGS. 3 and 4 are views of an interior cabin of a vehicle, showing various areas that a driver may view while operating the vehicle.

Because the camera 18 moves with the mirror head, adjustment of the mirror head to set the driver's preferred rearward view changes the position and viewing direction or principal viewing axis of the camera 18 relative to the fixed base portion or mounting structure or stay 16, and thus relative to the vehicle. Put another way, the driver monitoring camera and the mirror reflective element move together and in tandem with the mirror head when the mirror head is adjusted about the mounting structure to provide a rearward view for the driver of the vehicle. Responsive to image processing of image data captured by the DMS camera, DMS algorithms calculate or determine the driver eye gaze direction relative to the camera 18, and thus relative to the mirror head. Precise eye gaze direction analysis is important to understanding what part of the vehicle cabin the driver is looking at. This information allows the vehicle manufacturer to tailor their advanced driver or driving assistance systems (ADAS) to intervene appropriately when the user may be distracted and/or when the user is looking off the road (i.e., not looking ahead of where the vehicle is traveling along the road). FIG. 3 shows various locations where the system may determine that the driver is distracted or not looking in the right direction.

The system may be configured to determine or approximate the driver's gaze direction and the system may determine the driver's attention level based on an approximated region or target corresponding to the driver's gaze direction. For example, the system may be configured to determine when the driver is viewing forward of the vehicle and through the windshield directly in front of the driver side of the vehicle, in a bottom center region of the windshield in below the interior rearview mirror, in a bottom right region of the windshield in front of the passenger side of the vehicle, and in a bottom far right region of the windshield away from the side of the vehicle. The system may further determine if the driver is viewing the driver side exterior mirror or the passenger side exterior mirror, or if the driver is viewing off-road through the driver side window or the passenger side window. Moreover, the system may determine if the driver is viewing the instrument or gauge cluster, the infotainment display, the center console or gear shifter, the interior mirror assembly, the glovebox, and the dashboard. Furthermore, the system may determine if the driver is viewing above the windshield, such as at a headliner of the vehicle, along the top left region of the windshield or the top right region of the windshield. Some determined viewing regions or targets may indicate driver distraction (e.g., the infotainment display or center console), and other determined viewing regions or targets may indicate driver attention (e.g., directly ahead of the driver side of the vehicle or at the exterior mirror assembly).

Figure 4:
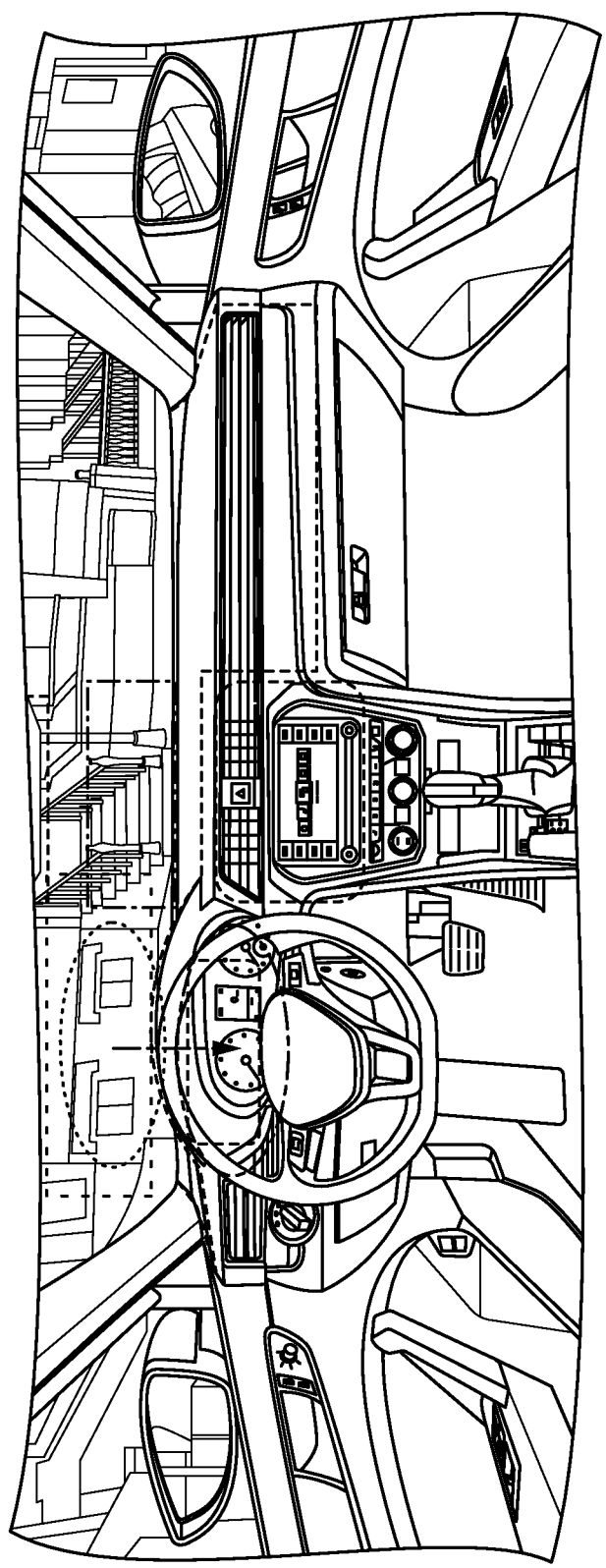

Understanding eye gaze direction relative to the camera 18 is increasingly complicated when the camera 18 is packaged inside a movable object, such as the mirror head of the interior rearview mirror assembly 10. Moving the mirror/camera without compensation can yield inaccurate determination of the drivers 'gaze zone.' In other words, if the orientation of the mirror head and position and view direction of the camera 18 is not accurately known or determined, the system may erroneously determine that the driver is looking forward of the vehicle when the driver is actually looking to one side or another or downward toward the instrument panel (see FIG. 4). That is, if the system is unable to determine movement of the mirror head and camera 18 relative to the vehicle, the system may determine inaccurate gaze directions of the driver and thus provide inaccurate driver distraction determinations.

Figure 5:
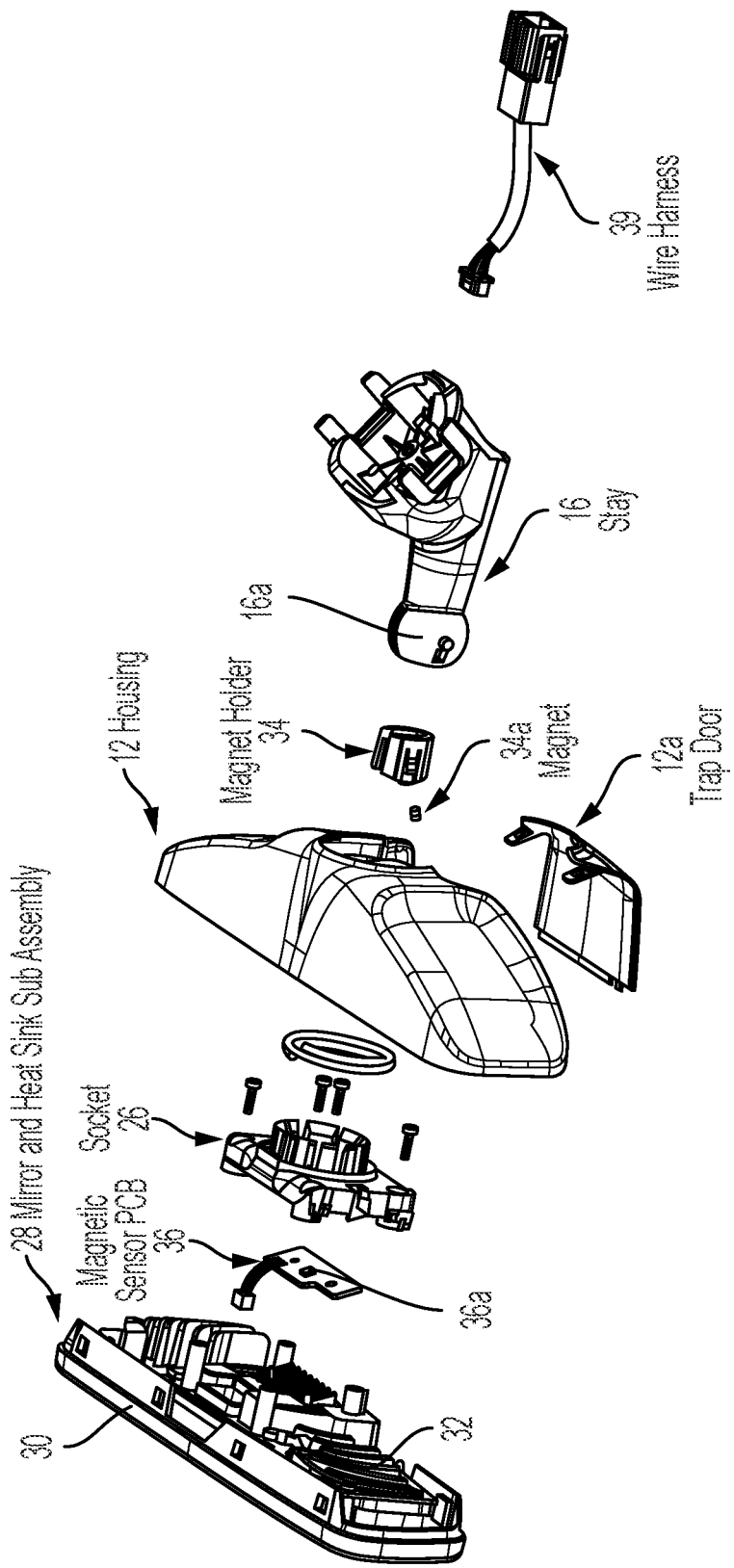
FIG. 5 is an exploded perspective view of the interior rearview mirror assembly.
Figure 6:
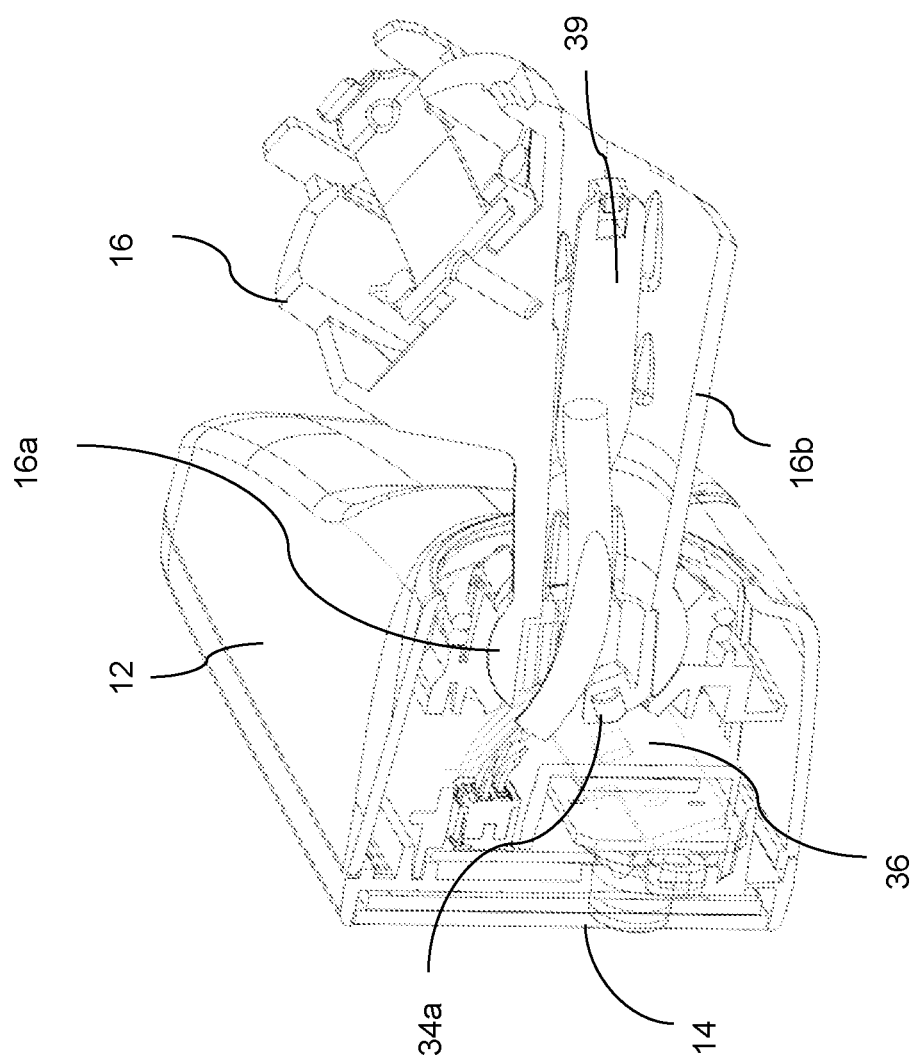
FIGS. 6-8 are sectional views of the interior rearview mirror assembly, showing a magnet disposed at a mounting ball of a mounting member and a magnetic sensing printed circuit board (PCB) disposed at the mirror head.
Figure 7:
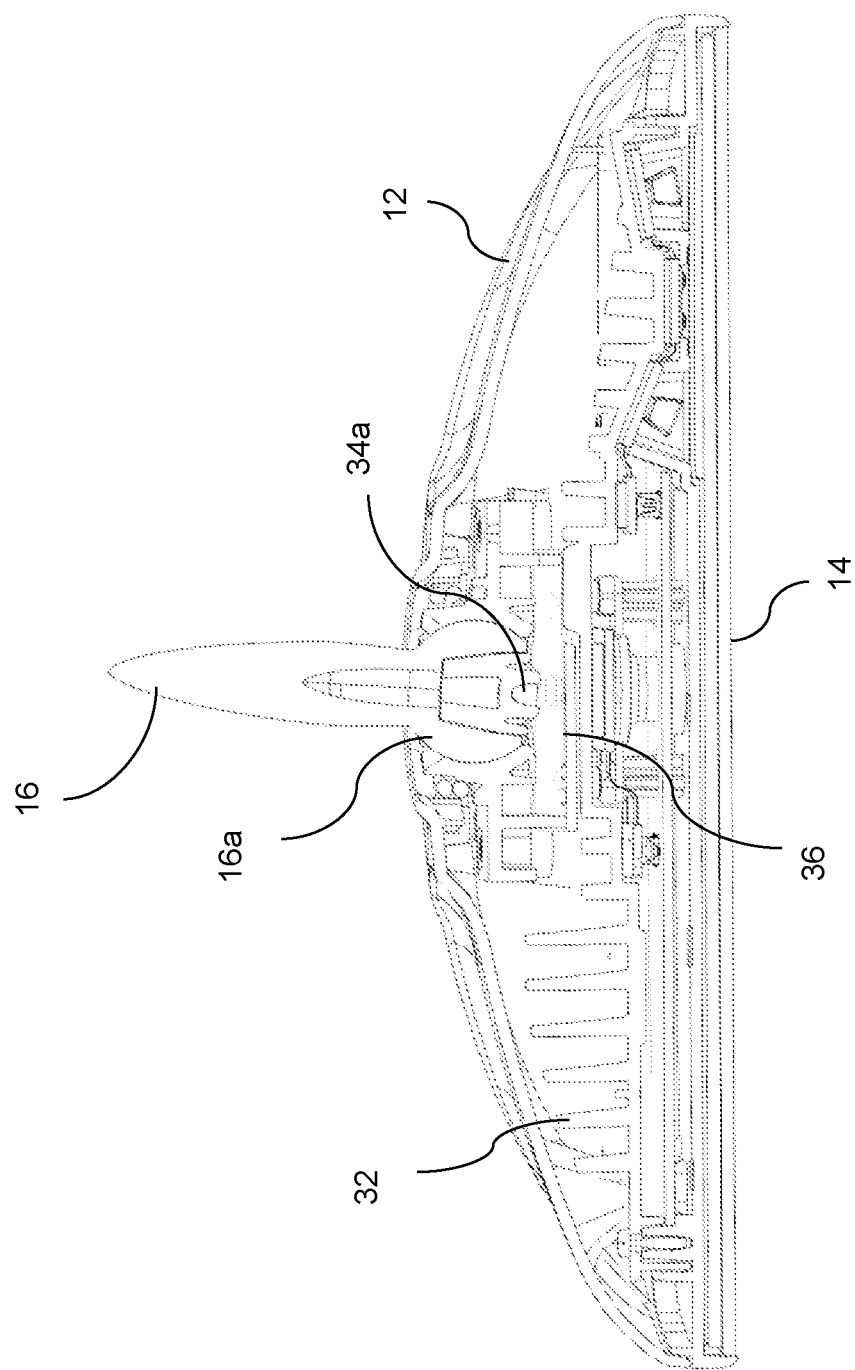

The interior rearview mirror assembly 10 includes a magnetic sensing device 36 having a magnetic sensor 36a and magnetic element 34a at the ball joint to determine orientation of the mirror head relative to the fixed base or stay 16. As shown in FIGS. 5-7, the interior rearview mirror assembly 10 includes the base or stay 16, which has a ball member 16a that is pivotally received in a socket 26 attached at the rear of the mirror reflective element assembly 28. The mirror reflective element assembly 28 includes the mirror reflective element 14 and the back plate 20, which may include a bezel or casing portion 30 and a heat sink 32. A magnet holder 34 is disposed at the stay 16 (such as at or integrated with the ball member 16a) and holds a magnetic element or magnet 34a at the ball member 16a, and a magnetic sensor PCB 36 is disposed at the mirror reflective element assembly 28 and at the socket 26 and includes the sensor 36a. A wire harness 39 is at the stay 16 and has wires that pass through the arm and ball member 16a of the stay 16 to electrically connect to a connector at the magnetic sensor PCB 36 (and optionally to electrically connect to electrochromic dimming circuitry of an electrochromic mirror reflective element and/or to circuitry of the DMS printed circuit board, such as to power and communicate with the DMS camera and light emitter). The mirror head includes a mirror housing or casing 12 (which may include a removable lower panel or "trap door" 12a that allows for access to the internal content of the mirror head).

Thus, the mirror head has a magnetic sensor PCB 36 fixed relative to the mirror head and that includes an integrated three-dimensional (3D) magnetic sensor (hall effect sensor) 36a at the sensor PCB 36 that detects the mirror head location relative to the mirror mount stay 16. The 3D hall effect sensor 36a is integrated onto the PCB 36 below the ball and socket pivot near the magnet 34a. The mirror head is free to rotate and move relative to the magnet 34a and ball member 16a, and thus the PCB 36 and integrated sensor 36a move according to and together and in tandem with movement of the mirror head. With the mirror mount 16 fixed relative to the windshield of the vehicle and the magnet 34a fixed relative to the mirror mount 16 at the ball member 16a, the 3D hall effect sensor 36a tracks the position of the magnet 34a in space to determine the mirror head rotation and/or distance relative to the fixed mirror stay 16. The hall effect sensor 36a can detect the strength and direction of the magnetic field produced by the magnet 34a and the system can, based on the output of the sensor or sensing device 36a, determine the orientation of the mirror head relative to the stay 16. In doing so, the position of the mirror head and camera 18 is always known to the DMS algorithms such that appropriate gaze directions can be determined. In other words, the system determines orientation of the mirror head relative to the mounting structure based on sensor data generated by the hall effect sensor 36a and image processing of image data captured by the driver monitoring camera is based at least in part on the determined orientation of the mirror head relative to the mounting structure.

Figure 8:
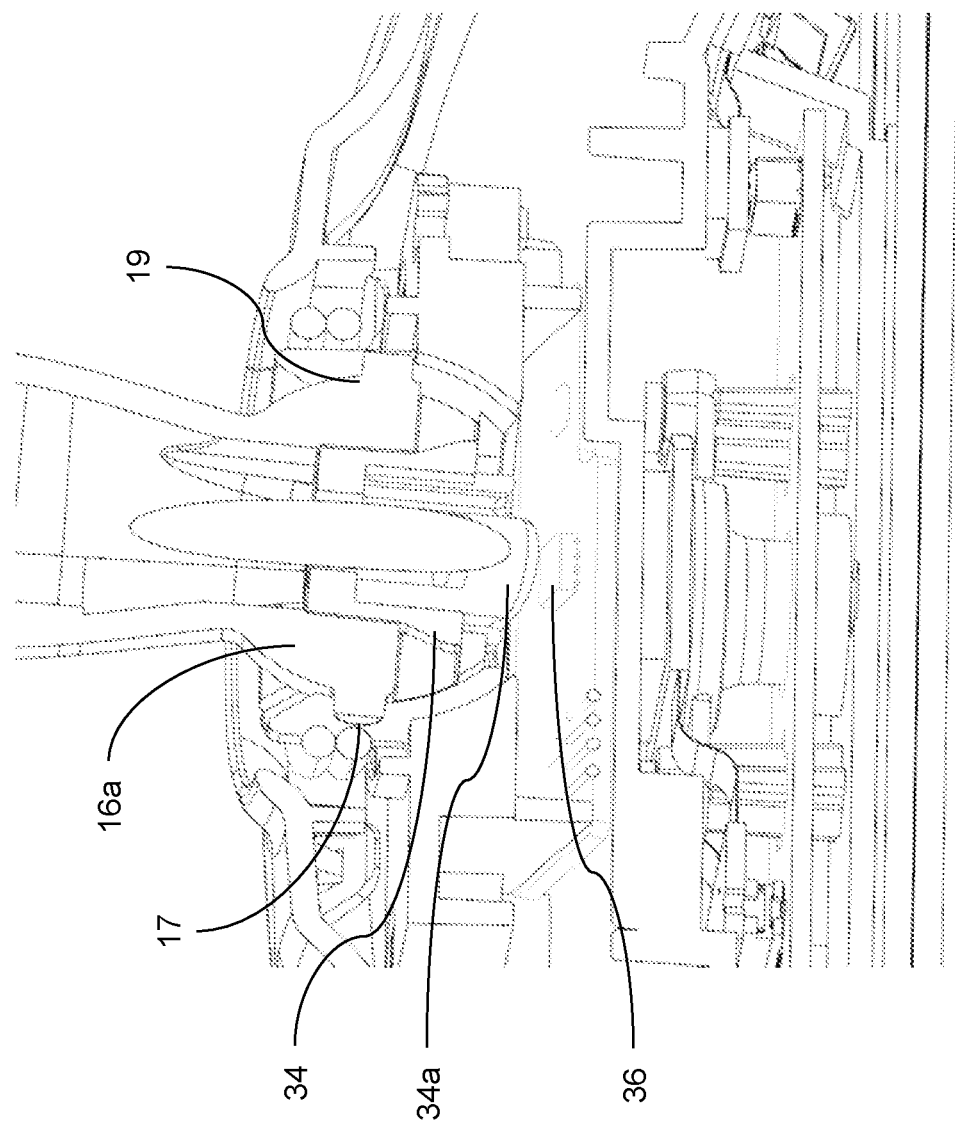
Figure 9:
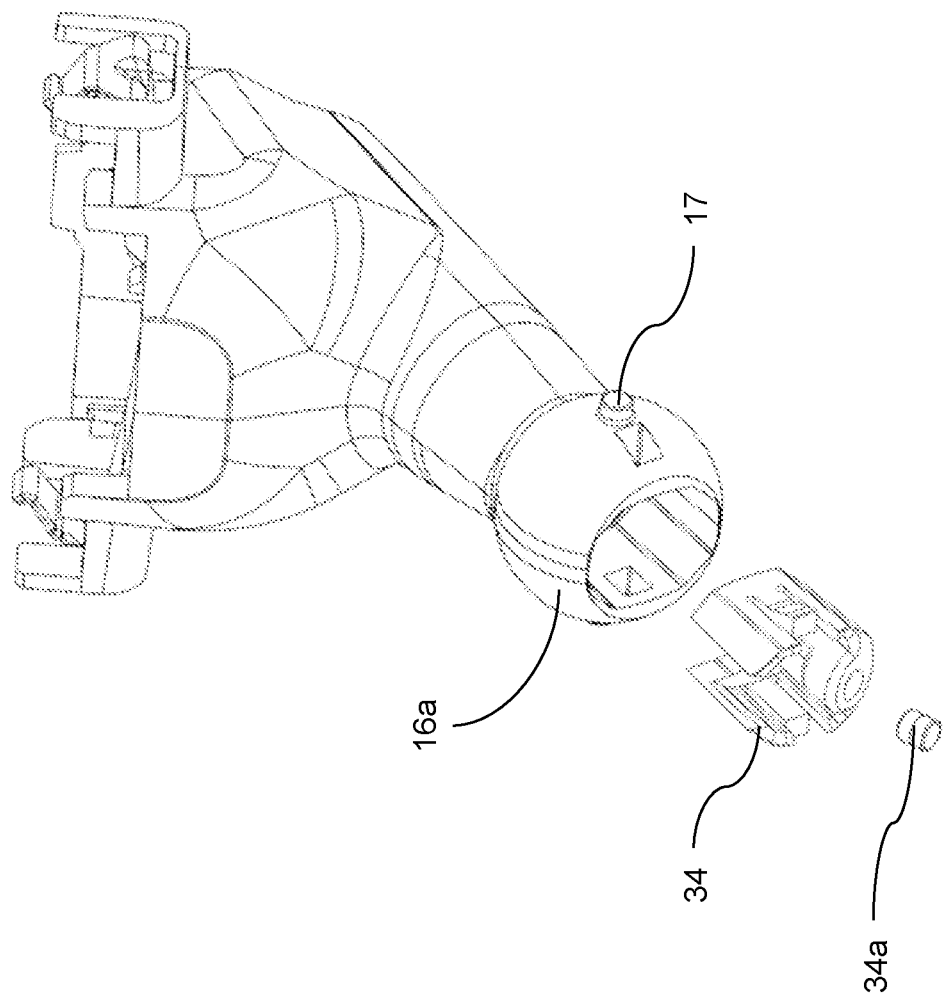
FIG. 9 is an exploded view of the mounting member with the magnet and a magnet holder received at the mounting ball of the mounting member.

As shown in FIGS. 8 and 9, one or more pins or bosses 17 may be formed on the ball member 16a, such as at opposing sides of the ball member 16a, and protrude radially from the ball member 16a. When the ball member 16a is received at the socket 26, the bosses 17 may be received along respective channels or recesses or tracks 19 formed in the socket 26 to locate the ball member 16a within the socket 26 to provide a secure attachment between the ball member 16a and socket 26 and to provide a reliable known positioning between the ball member 16a and socket 26 for the 3D hall effect sensor 36a. The bosses 17 and tracks 19 may limit rotational movement of the mirror head relative to the ball member 16a and mirror stay 16, and thus may improve accuracy of the hall effect sensor position tracking. That is, rotation of the mirror head about a longitudinal axis of the mirror mount 16 may be limited by the bosses 17. In other words, the bosses 17 are integrated onto the ball 16a and receiving tracks 19 are integrated into the socket 26 to limit clocking rotation of the mirror head.

Thus, with the bosses 17 extending laterally from opposing sides of the ball member 16a and received along respective tracks 19 formed along opposing sides of the socket 26, the mirror head may be free to pivot or tilt about a horizontal pivot axis extending along the longitudinal axis of the mirror head and to pivot or tilt about a vertical pivot axis extending perpendicular to the horizontal pivot axis. Rotation of the mirror head about the ball member 16a and about an axis normal to the horizontal pivot axis and the vertical pivot axis is limited or precluded by the bosses 17 along the tracks 19. Processing of sensor data captured by the sensor 36a to determine the position of the mirror head and/or camera 18 relative to the vehicle may be simplified by constraining movement of the mirror head about at least one axis.

The magnetic sensor 36a at the PCB 36 may comprise a 3D hall effect sensor, such as a TRIAXIS sensor commercially available from Melexis, or such as an Allegro ALS31313 sensor or other suitable sensor. The sensor 36a enables a planar IC of 3D magnetic field measurement and brings mechanical flexibility, with mounting in almost any orientation. The sensor 36*a* is capable of high operating temperature (e.g., up to 125 degrees Celsius or greater) and provides angle computation stability versus temperature variations, magnetic tolerances, and mechanical tolerances, and allows a smaller and cost-effective magnet to be used. The sensor 36*a* may have an I2C output and may provide a low voltage/low power application.

The magnet holder 34 may be integrated into the ball member 16*a* or coupled to the ball member 16*a*, such as clipped into position at the ball member 16*a*. The magnet 34*a* is received in the magnet holder 34 and provides the magnetic field that generates the detected voltage change at the 3D hall effect sensor 36*a*.

With the DMS camera 18 disposed in the mirror head, the camera 18 moves with the mirror head (including the mirror casing and mirror reflective element that pivot at a pivot joint that pivotally connects the mirror head to the mounting structure of the interior rearview mirror assembly that in turn mounts at a windshield or at a headliner of the equipped vehicle), such that, when the driver adjusts the mirror head relative to the mounting structure 16 to adjust the view rearward, the position and viewing angle of the camera 18 is adjusted as well. The system may be established or programmed or set such that the camera 18 is at a known location and orientation relative to a baseline or initial position/orientation of the mirror head, whereby the magnet 34*a* at the stay 16 is at a known position relative to the sensor 36*a* at the reflective element assembly. Movement of the mirror head, and thus the camera 18, moves the sensor 36*a* relative to the magnet 34*a*. That is, as the mirror head pivots and the socket 26 pivots relative to the fixed ball 16*a* and stay 16, the sensor 36*a* moves about the magnet 34*a* in three axes, and the processor and system can determine the degree of movement and thus the current position of the sensor 36*a* relative to the magnet 34*a*, and thus the current position of the mirror head (and camera) relative to the stay 16. The circuitry and algorithm tracks the movement of the sensor 36*a* and determines the position of the sensor 36*a* relative to the magnet 34*a* and determines the change in position and orientation of the camera 18. The system thus provides a non-contacting sensing device (where the sensor and the magnet do not contact one another as the mirror head is adjusted and the sensor moves relative to the magnet) that can calculate or determine the orientation of the camera 18 and the viewing direction or principal viewing axis of the camera 18 responsive to processing of the sensor output.

Optionally, the magnet may be disposed at the mirror head and the magnetic sensor PCB and sensor may be disposed at the stay, such as to provide a smaller packaging design of the mirror head. Thus, the magnetic sensor determines movement of the magnet and mirror head relative to the stay and magnetic sensor PCB as the mirror head is adjusted.

Optionally, the system may determine position of the mirror head and the camera 18 relative to the mounting structure 16 via a potentiometer. For example, the PCB at the socket 26 at the mirror head may include one or more electrically conductive traces and one or more electrically conductive wipers may be disposed at the mounting structure 16 and engaging corresponding ones of the traces. As the mirror head is moved relative to the mounting structure 16, the wipers move along the respective traces and the system tracks position of the mirror head based on the position of the wipers along the traces. The system may utilize aspects of the systems and mirror assemblies described in U.S. Pat. No. 11,292,389 and/or U.S. Publication No. US-2021-0323477, which are hereby incorporated herein by reference in their entireties.

Optionally the system may determine the position and/or orientation of the mirror head relative to the mounting structure via an orientation detection sensor, such as, for example, a Micro-Electro-Mechanical Systems (MEMS) sensor that measure forces of nature (gravity, accelerations), or one or more accelerometers and/or geomagnetic field sensors, or a gyroscope sensor that measures the rate or rotation of the mirror head and the outputs of the gyroscope sensor may be compared to outputs of a gravity sensor that generates a three-dimensional vector indicating direction and magnitude of gravity at the mirror head. Based on the outputs of the one or more orientation/acceleration/gravity sensors, the system determines orientation of the mirror head relative to the mounting structure and adjustment or movement of the mirror head relative to the mounting structure.

In some examples, the mirror reflective element 14 includes a video display screen accommodated by the mirror head (and movable together and in tandem with the mirror head and mirror reflective element when the mirror head is adjusted) and operable to display video images for viewing by the driver of the vehicle. For example, the video display screen may display video images intended to represent or enhance the field of view provided by a traditional mirror reflective element, such as to reduce or eliminate effects of passengers, cargo, and/or trailers that may otherwise block the field of view provided by a traditional mirror reflective element. The video display screen displays video images generated from image data captured by one or more cameras of a camera monitoring system (CMS) or surround view system (SVS) of the vehicle. The field of view provided by the video display screen may adjust as the driver adjusts the mirror head relative to the mounting structure 16. Thus, based on the determined position of the magnet 34*a* relative to the sensor PCB 36, the system may determine the position of the mirror head relative to the mounting structure 16 and the driver and adjust the field of view provided at the video display screen based on the determined position of the mirror head relative to the mounting structure and the driver.

In other words, the one or more cameras at the vehicle may capture image data representative of a scene or a field of view rearward of the vehicle. The rearward-viewing camera or cameras have a wide field of view (e.g., greater than 135 degrees, such as greater than 180 degrees) at least rearward of the vehicle. The video images displayed at the display screen are derived from the image data captured by the at least one rearward-viewing camera and may represent a portion of the overall scene or field of view of the at least one rearward-viewing camera. The video images may be representative of the reflections provided by the mirror reflective element (when the video mirror display is not activated), so the portion of the scene or field of view displayed at the video display screen (i.e., the portion of the image data from which the video images are derived) may be based on the position and/or orientation of the mirror head relative to the mounting structure.

That is, the field of view of or the scene viewed by the at least one rearward-viewing camera may be larger than the field of view provided by the reflections at the mirror reflective element at any one position of the mirror head. Thus, the displayed portion of the field of view of the at least one rearward-viewing camera (the displayed portion of the scene viewed by the at least one rearward-viewing camera) is selected or generated to represent or correspond to what the field of view provided by the mirror reflective element would be at the current positon of the mirror head. The portion of the scene that is displayed is adjusted based on the determined orientation of the mirror head relative to the mounting structure. In other words, the overall field of view of the at least one rearward-viewing camera may be cropped to establish the displayed portion, and the cropping of that displayed portion may be adjusted or moved relative to the overall viewed scene to provide a rearward view to the driver that generally corresponds to the view that the mirror reflector would provide to the driver.

The displayed portion of the scene viewed by the at least one rearward-viewing camera and represented by the video images may be adjusted based on movement of the mirror head relative to the mounting structure or based on movement of the driver's head relative to the mirror head. For example, if the mirror head is adjusted to be angled more toward the driver side of the vehicle, the portion of the scene viewed by the at least one rearward-viewing camera represented by the video images may be adjusted or shifted toward the driver side of the vehicle.

With the PCB 11 (FIG. 10) disposed at the mirror head, circuitry for controlling dimming of the mirror reflective element 14 may be disposed at a first side of the PCB 11 facing the mirror reflective element 14 (DMS control circuitry and/or control circuitry for the video display screen may also be disposed at the PCB), and the heat sink 32 is thermally coupled to the opposite, second side of the PCB 11 to draw heat away from the PCB 11 and to the exterior of the mirror head. For example, the heat sink and mirror head may include characteristics of the mirror assemblies described in U.S. provisional patent application Ser. No. 63/477,833, filed Dec. 30, 2022, which is hereby incorporated herein by reference in its entirety.

Referring to FIGS. 10-14, the mirror assembly 10 includes an ambient light sensor 38 for determining ambient light levels at the interior cabin of the vehicle. For example, the system may determine ambient light levels for controlling dimming of the mirror reflective element 14 or to aid in processing of image data captured by the driver monitoring camera 18. The ambient light sensor 38 is accommodated by the mirror head and views through an aperture 40 in the mirror casing 12. That is, the ambient light sensor 38 captures sensor data representative of light that passes through the aperture 40 in the mirror casing 12 and an ambient light level at the interior cabin of the vehicle is determined based on the captured sensor data. In the illustrated example, the ambient light sensor 38 is disposed at the second side of the PCB 11 that faces the mirror casing 12.

Thus, the aperture 40 is formed at the rear of the mirror casing 12 to allow for ambient light to enter the mirror head, and a channel or light guide or light sensor cone 42 is formed in the mirror head between the aperture 40 and the ambient light sensor 38 to allow for passage of light from exterior the mirror head to the ambient light sensor 38. That is, structure of the mirror head, such as the mirror casing 12, the back plate 20, and/or the heat vent 32, may cooperate to form the channel or light cone 42 between the aperture 40 and the ambient light sensor 38 so that light is directed from exterior the mirror head along the light channel 42 to the ambient light sensor 38.

The position of the ambient light sensor 38 relative to the aperture 40 and light cone 42 is secured via an adhesive element 44 circumscribing the ambient light sensor 38 at the PCB 11 and engaging one or more structures of the mirror head. For example, in FIG. 10, the adhesive element 44 engages the heat vent 32 and the mirror casing 12 at an inner end of the light cone 42 surrounding the ambient light sensor 38. Thus, the adhesive element 44 is disposed at the second side of the PCB 11 and engages an end of the light cone 42 at the mirror casing 12 and/or the heat vent 32 to position the ambient light sensor 38 relative to the light cone 42. The adhesive element 44, such as an adhesive tape or glue ring, may block or attenuate light from passing through the adhesive element 44 to isolate the ambient light sensor 38 from any light sources within the mirror head (e.g., the DMS light emitter or the video display screen) so that data captured by the sensor 38 is representative of ambient light in the cabin and not light emitted from another electronic component within the mirror head.

Figure 12:
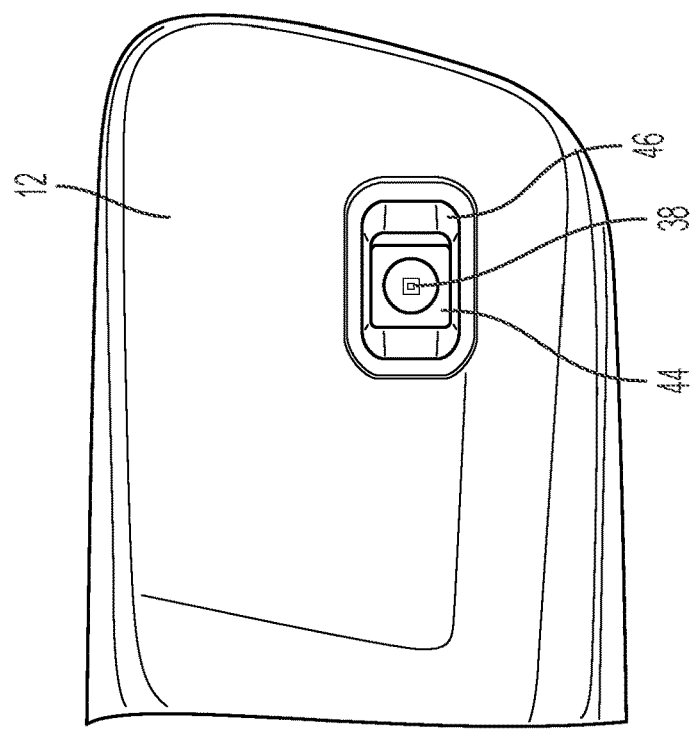
FIG. 12 is a perspective view of the portion of the interior rearview mirror assembly of FIG. 11.
Figure 11:
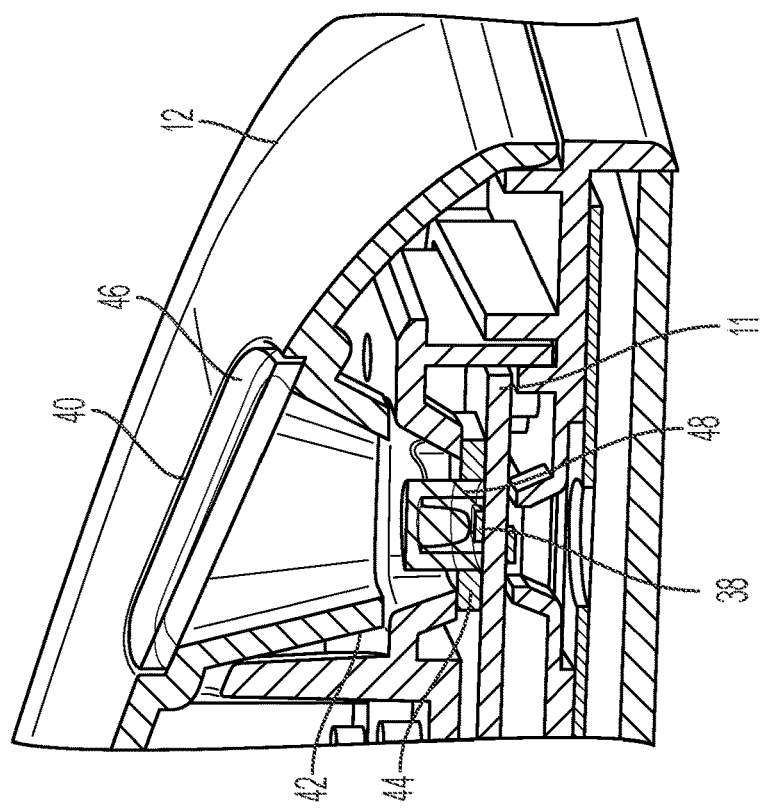
FIG. 11 is a sectional view of a portion of the interior rearview mirror assembly with a window lens disposed over the aperture in the mirror casing.

As shown in FIGS. 11 and 12, a window lens or cover element 46 may be disposed at the aperture 40 in the mirror casing 12 to cover the aperture 40 and provide an uninterrupted exterior surface of the mirror casing 12. That is, the window lens 46 may substantially fill the aperture 40 and have an exterior surface that is substantially flush with the outer surface of the mirror casing 14 at and near or surrounding the aperture 40. Furthermore, the window lens 46 may be darkened or tinted to further blend the surface of the mirror casing 12 with the window lens 46. For example, the window lens 46 may allow for 50 percent light transmissivity, 40 percent light transmissivity, 20 percent light transmissivity, 10 percent light transmissivity, 5 percent light transmissivity, or any suitable percentage of light transmissivity. Thus, the ambient light sensor 38 captures sensor data representative of light that passes through the window lens 46 and along the light cone 42.

To accommodate the lower light transmission provided by the window lens 46, an optic element 48 may be disposed between the aperture 40 and the ambient light sensor 38 and/or along the light cone 42 to focus or guide light to the ambient light sensor 38. The optic element 48 may be disposed at and/or adhered to the PCB 11 and circumscribing the ambient light sensor 38, and extending from the PCB 11 and over the ambient light sensor 38 to direct light entering the aperture 40 to the ambient light sensor 38. In the illustrated example, the optic element 48 is attached to the PCB 11 and circumscribes the ambient light sensor 38 between the sensor and the adhesive element 44.

Figure 14:
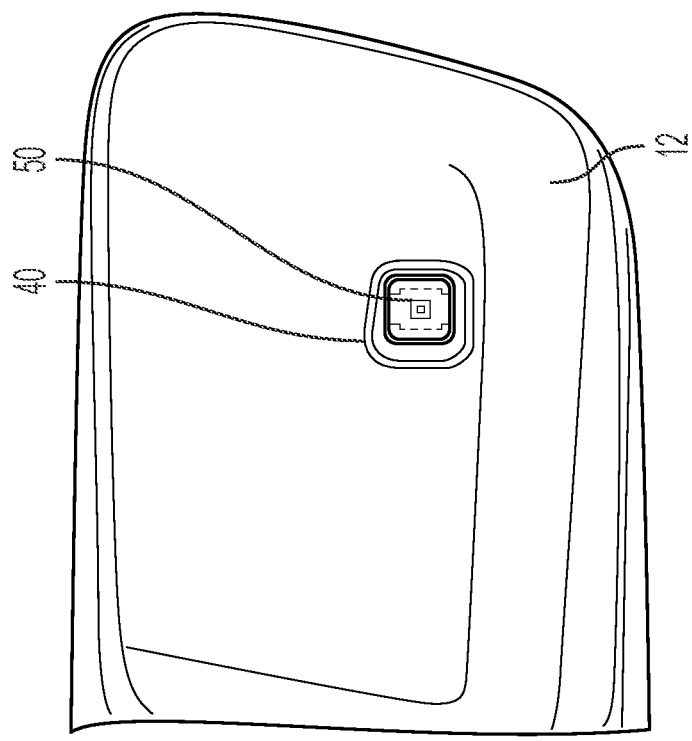
FIG. 14 is a perspective view of the portion of the interior rearview mirror assembly of FIG. 13.
Figure 13A:
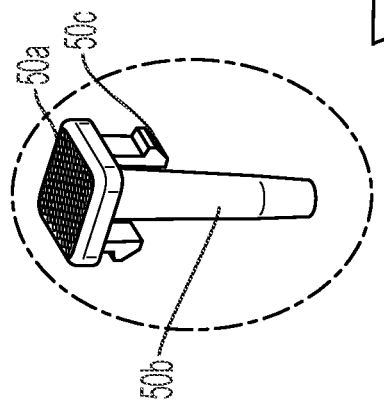
FIG. 13A is an enlarged view of the light pipe of FIG. 13.
Figure 13:
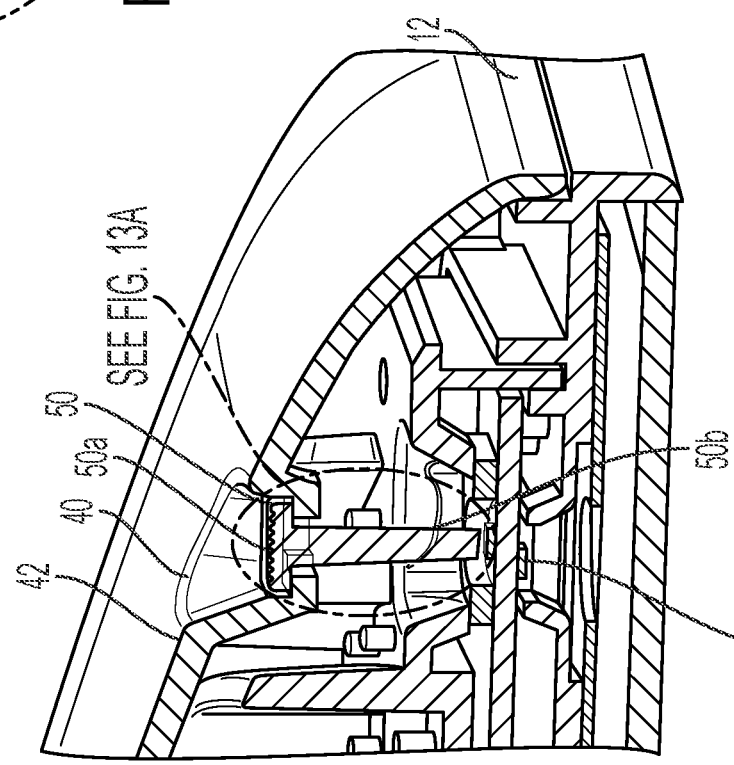
FIG. 13 is a sectional view of a portion of the interior rearview mirror assembly with a light pipe disposed in the aperture in the mirror casing.

Referring to FIGS. 13, 13A, and 14, a light pipe optic element 50 may be disposed at the aperture 40 for capturing and funneling or directing light from the aperture 40 to the ambient light sensor 38. The light pipe 50 provides a more direct path for light from the aperture 40 to the ambient light sensor 38 and may focus light at or near the ambient light sensor 38. Thus, the aperture 40 may be reduced in size, with the light pipe 50 providing suitable levels of light for the ambient light sensor 38 to detect the level of ambient light at the vehicle cabin.

As shown in FIGS. 13 and 13A, the light pipe 50 includes a planar or contoured outer portion 50a disposed in the aperture 40 and at the exterior of the mirror head and a cylindrical or funnel portion 50b extending within the mirror head toward the ambient light sensor 38 and substantially perpendicular to the planar outer portion 50a. One or more clips or retaining elements 50c may extend from the outer portion 50a to engage the mirror casing 12 along the light guide channel 42 to secure the light pipe 50 at the mirror casing 12. The outer portion 50a may be disposed at the aperture 40 and flush with the outer surface of the mirror casing 12 or the light pipe 50 may be at least slightly recessed along the light guide channel 42 from the aperture 40 and the outer surface of the mirror casing 12.

Optionally, the outer portion 50a may comprise any suitable outer surface profile or contour, such that the outer portion 50a substantially conforms to the outer surface of the mirror casing 12 and cooperates to provide a continuous or uninterrupted outer profile of the mirror casing 12. Individual fibers or optic elements may extend from the outer portion 50a and along the cylindrical portion 50b to direct light from exterior the mirror head to the ambient light sensor 38.

Thus, the mirror casing 12 with the window lens 46 and/or light pipe 50 may improve the styling of the interior rearview mirror assembly by filling and/or reducing the aperture 40 for the light sensor cone. The system maintains functionality over the sensitivity distribution. That is, even with the reduced or covered aperture 40, the system is sensitive to detecting ambient light levels at the interior of the vehicle. The solution may blend into the Class-A (i.e., outer surface) of the interior rearview mirror.

Figure 16:
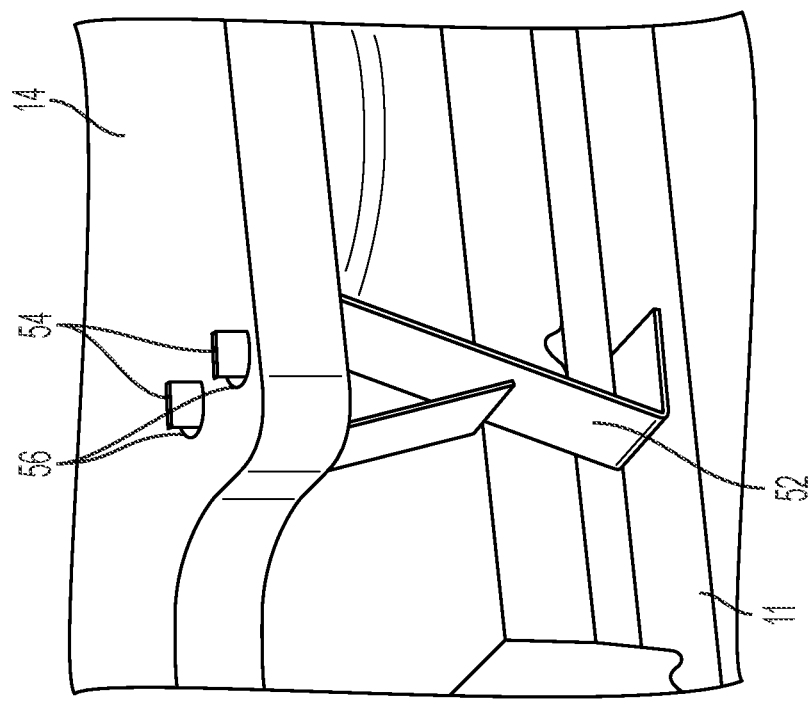
FIG. 16 is a perspective view of the spring contact of FIG. 15 electrically coupling the PCB and mirror reflective element of the interior rearview mirror assembly.
Figure 15:
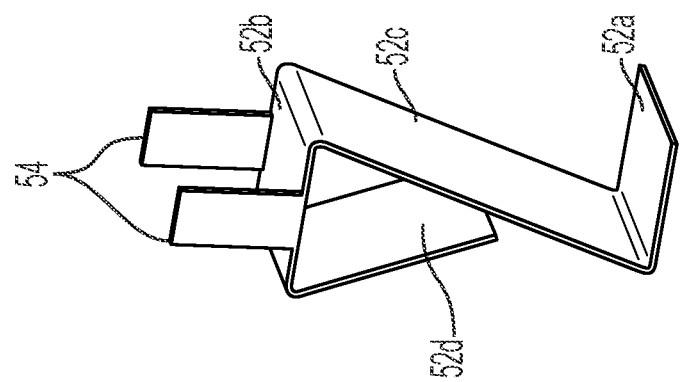
FIG. 15 is a perspective view of an electrically conductive spring contact.

Referring to FIGS. 15 and 16, one or more spring contacts 52 (such as two spring contacts) may electrically couple the electrically conductive coatings or films of the mirror reflective element 14 and the PCB 11 within the mirror head for supplying electric current to the EC cell of the mirror reflective element 14. As shown, the spring contact 52 includes a first end 52a that is integrated into or electrically coupled to the PCB 11 and a second end 52b that electrically couples to electrical contacts or electrically conductive traces at the mirror reflective element 14. A middle portion 52c may extend between the first end 52a and the second end 52b at an oblique angle relative to the first and second ends to provide a flexible or springy support between the mirror reflective element 14 and the PCB 11. A return portion 52d may extend from the second end 52b and toward the first end 52a and the middle portion 52c.

One or more flanges 54 may extend from the second end 52b of the spring contact 52 to electrically couple to the mirror reflective element 14. In the illustrated example, the flanges 54 extend perpendicular to the second end 52b and within respective apertures 56 of the mirror reflective element 14 to electrically couple to the EC cell of the mirror reflective element 14.

The spring contacts 52 may comprise any suitable electrically conductive construction, such as a flexible thin sheet metal construction. Furthermore, the spring contacts 52 provide a small mounting footprint within the mirror head, such as a mounting width of 2.16 millimeters or less and a contact width of 1.84 millimeters or less. Thus, the spring contacts 52 provide a thin and reduced cost method of supplying voltage to the EC cell that does not increase the difficulty of the assembly process. The flanges 54 keep the spring contact 52 in position during the reflow process.

The location of the DMS camera and IR LED(s) at the mirror head provides an unobstructed view to the driver. The DMS preferably is self-contained in the interior rearview mirror assembly 10 and thus may be readily implemented in a variety of vehicles, including existing vehicles and different models of the same vehicle brand (for example, in a BMW 3-series model and in a BMW X3 model and in a BMW 5-series model and in a BMW X5 model and in an BMW 7-series model, etc.). The driver monitoring camera may also provide captured image data for an occupancy monitoring system (OMS) or another separate camera may be disposed at the mirror assembly for the OMS function.

The mirror assembly 10 may also include one or more infrared (IR) or near infrared light emitters (such as IR or near-IR light emitting diodes (LEDs) or vertical-cavity surface-emitting lasers (VCSEL) or the like) disposed at the back plate 20 behind the reflective element 14 and emitting near infrared light through the aperture of the back plate 20 and through the reflective element 14 toward the head region of the driver of the vehicle. The IR emitter device comprises an IR emitter or LED printed circuit board, with a first set of near infrared light emitting diodes (e.g., a set of wider beam LEDs) at one part of the LED PCB and a second set of near infrared light emitting diodes (e.g., a set of narrower beam LEDs) at another part of the LED PCB. The LED PCB may have one part angled relative to the other part so that the first set of LEDs or the second set of LEDs may be operated to emit light in a desired direction depending on the orientation of the mirror head. For example, the first set of near infrared light emitting diodes may be angled toward the left side of the vehicle so as to be directed toward a driver of a left hand drive vehicle (if the mirror assembly is installed in a left hand drive vehicle and the first set of near infrared light emitting diodes are enabled for the driver monitoring function), while the second set of near infrared light emitting diodes may be angled toward the right side of the vehicle so as to be directed toward a driver of a right hand drive vehicle (if the mirror assembly is installed in a right hand drive vehicle and the second set of near infrared light emitting diodes are enabled for the driver monitoring function).

Conventional driver monitoring systems (DMS) in likes of BMW, Ford, GM, Tesla, and Subaru vehicles (for example, for GM SuperCruise™ or for Ford's BlueCruise™ as described in https://www.consumerreports.org/car-safety/driver-monitoring-systems-ford-gm-earn-points-in-cr-tests-a6530426322) are "Two-Box" DMS in that (i) the camera used to monitor the driver's head/eyes and the near-IR emitting light sources that illuminate the driver's head/eyes are accommodated in a first box or module (that is usually located at the steering column of an equipped vehicle or in an overhead region of the equipped vehicle) and (ii) the electronics/software used to analyze captured image data to determine the driver's gaze direction or head position or eye movement or alertness or drowsiness is accommodated in a separate second box or module that is located remote from and at a distance from the first box and that connects to the first box typically via a wired connection (the second box typically comprises an ECU that can be part of a head unit of the equipped vehicle and that besides DMS, optionally can provide other features).

A "One-Box" DMS interior rearview mirror assembly has both the camera used to monitor the driver's head/eyes and the near-IR emitting light sources that illuminate the driver's head/eyes accommodated by an interior rearview mirror assembly (and preferably, are both accommodated within the mirror head of the interior rearview mirror assembly). Thus, the one-box DMS interior rearview mirror assembly allows an original equipment manufacturer (OEM) of vehicles (such as for example VW or Toyota or Honda or GM or Ford) to equip vehicles with the likes of a DMS interior rearview mirror assembly that includes the camera/illumination sources/driver monitoring software/associated driver monitoring electronic circuity such as data processing chip(s), memory, electronic components, printed circuit board(s) that includes data processing chip(s), memory, electronic components, light sensors for detecting glare and ambient lighting, and that includes power supplies, electrical connector(s), heat sink(s), mechanical parts, etc. The One-Box Interior DMS Rearview Mirror Assembly thus can be purchased by an OEM from an interior rearview mirror assembly manufacturer and can be installed by that OEM into a being-assembled vehicle (typically mounting to a mirror mounting button or similar element that is adhered to the in-cabin side of the windshield of the vehicle). To operate in the equipped vehicle, the One-Box Interior DMS Rearview Mirror Assembly connects to a vehicle wiring harness of the vehicle and is supplied via this vehicle wiring harness with ignition voltage (nominal 12V DC but can vary from 9V (6V for automatic stop/start) to 16V or so depending on the vehicle type and the operating condition of the vehicle). The one-box Interior DMS rearview mirror assembly via this wiring harness is supplied with vehicle data, such data including vehicle and other data supplied via a CAN bus or link (that can carry to the mirror vehicle information and that can carry from the mirror distraction alerts, etc.) or supplied via a Local Area Network (LIN) bus or line.

In the illustrated embodiment, the camera 18 and light emitters 24 are disposed behind the mirror reflective element 14, which may a prismatic mirror reflective element or an electro-optic (such as electrochromic or EC) mirror reflective element. The mirror casing 12 may include a plastic bezel portion 30 that circumscribes the perimeter edge of the mirror reflective element 14 and that provides an outer curved surface that transitions from the outer surface of the mirror casing 12 to the planar front surface of the mirror reflective element 14 (optionally with no part of the plastic bezel portion overlapping or overlaying onto the planar front surface of the mirror reflective element), such that the plastic bezel 30 completes the homologated edge. Optionally, the mirror reflective element 14 may provide an exposed outer curved surface that transitions from the outer surface of the mirror casing 12 to the planar front surface of the mirror reflective element 14.

The light emitter 24 may have two or three sets of LEDs disposed on the circuit board. One set of LEDs emits a wider beam of near infrared light when energized (e.g., four wider beam LEDs) and another set of LEDs emits a narrower beam of near infrared light when energized (e.g., four narrower beam LEDs). The narrower beam LEDs may be powered or energized for the driver monitoring function, while the wider beam LEDs may be powered or energized for the occupant monitoring function (and may be episodically energized for illuminating particular frames of captured image data, such as by utilizing aspects of the systems described in International Publication Nos. WO 2022/241423 and/or WO 2022/187805, which are hereby incorporated herein by reference in their entireties).

The narrow beam LEDs may be angled or canted or biased (e.g., by ten degrees or thereabouts) toward the left and thus toward the driver of a left hand drive vehicle, while the wider beam LEDs are not biased toward either side. When the mirror assembly is installed in a left hand drive vehicle, the narrow beam LEDs illuminate the driver's head region while the wider beam LEDs illuminate the passenger area as well as the driver area. However, when the mirror assembly is installed in a right hand drive vehicle, the narrow beam LEDs do not illuminate the driver's head region while the wider beam LEDs illuminate the passenger area as well as the driver area.

The mirror assembly may include a near infrared light emitter that is configured and operable to selectively emit light toward the driver head region when the mirror assembly is disposed in a left hand drive vehicle (with the driver sitting in a left side driver seat) or when the mirror assembly is disposed in a right hand drive vehicle (with the driver sitting in a right side driver seat). The system provides for DMS/OMS illumination that is software configurable based on vehicle data for the country code. For example, the DMS light emitters may comprise two or three separate banks/groups/sets of emitters or LEDs. One group is aimed or angled toward the left hand side of the vehicle and one group is aimed or angled toward the right hand side of the vehicle. Optionally, there is a third group that is aimed somewhere in between (for example, the third group may be directed perpendicular to the mirror surface). These groups or sets can be made up of various combinations of wide and narrow LEDs or VCSELs.

Thus, the vehicular interior rearview mirror assembly is associated with a driver monitoring system (DMS) and/or occupant monitoring system (OMS) of the vehicle. The interior rearview mirror assembly includes the mirror head adjustably attached to mounting structure that attaches at an interior portion of a cabin of the vehicle. For example, the mounting structure includes the mirror stay 16 with the ball member 16a at the end of the arm of the mirror stay 16. The mirror head accommodates the mirror reflective element 14 that includes the mirror reflective coating disposed at the rear surface of the glass substrate of the mirror reflective element 14. The mirror head accommodates the camera 18 and the camera 18 moves together and in tandem with the mirror head when the mirror head is adjusted to set the rearward view of the driver of the vehicle. The camera 18 may view through the glass substrate and the mirror reflective coating of the mirror reflective element 14. The mirror head accommodates the ECU, which includes electronic circuitry (e.g., an image data processor) and associated software, and the ECU processes image data captured by the camera for an occupant monitoring function and/or a driver monitoring function. To improve accuracy of the DMS and/or OMS, the mirror assembly includes a magnetic sensing device that captures sensor data representative of a location or position or orientation of the mirror head relative to the mounting structure 16 as the mirror head is adjusted relative to the mounting structure 16. Based on the captured sensor data, the system determines position and viewing angle of the camera 18 and the image data is processed based at least in part on the determined position and viewing angle.

In some examples, the magnetic sensing device includes a magnetic hall effect sensor 36a and a magnet 34a. The hall effect sensor 36a and magnet 34a may be positioned at a pivot joint connecting or mounting the mirror head to the mounting structure 16, such as at or near the ball member 16a and the socket 26 at the mirror head. For example, the hall effect sensor 36a may be disposed at the PCB 36 disposed at or near or behind the socket 26 and the magnet 34a may be disposed at the magnet holder 34 disposed at or near or integrated with the ball member 16a of the mounting structure 16.

The sensing device may include a potentiometer, such as a potentiometer including a PCB having an electrically conductive trace and an electrically conductive wiper that moves along the trace as the mirror head is adjusted relative to the mounting structure. For example, the PCB and the electrically conductive wiper element are at the pivot joint that mounts the mirror head at the mounting structure, such as the PCB is disposed at the socket element of the pivot joint and the electrically conductive wiper element is disposed at the ball member of the pivot joint.

The ball member 16a of the pivot joint may include bosses or protrusions 17 extending radially from opposite sides of the ball member 16a. The bosses 17 are received along respective channels or guides 19 of the socket element 26 and limit movement of the mirror head relative to the mounting structure 16.

The mirror head may accommodate a light emitter 24, such as a light emitter that is electrically operable to emit near infrared (NIR) light. The light emitter 24 may include a plurality of light emitting didoes (LEDs) or a plurality of vertical-cavity surface-emitting lasers (VCSELs). Further, the light emitter 24 may be disposed within the mirror head behind the mirror reflective element 14 and operable to emit light through the mirror reflective element 14 to illuminate at least a portion of the interior cabin of the vehicle.

In some examples, mirror assembly may have a chin region that extends along and below the lower edge of the mirror reflective element to accommodate the camera and/or the light emitters at the lower edge of the mirror reflective element. For example, the mirror reflective element may include the video display screen that extends along the mirror reflective element above the chin region and the camera may be accommodated at the chin region below the video display screen so that the camera views through the mirror reflective element and not through the video display screen. Optionally, a separate light transmitting cover element or portion of the glass substrate (e.g., a portion of a front glass substrate of an electrochromic mirror reflective element) extends over the chin region so that the camera views through the cover element or portion of the glass substrate, whereby the camera does not view through the mirror reflector of the mirror reflective element.

The mirror head accommodates the video mirror display screen that displays video images viewable by the driver. For example the video images may be representative of the view provided by the mirror reflective element. Based on the sensing device determining that the mirror head is adjusted or pivoted relative to the mounting structure, the video images are adjusted to represent the rearward view provided at the adjusted angle.

In some examples, the mirror head accommodates an ambient light sensor 38 that captures sensor data representative of an ambient light level at the cabin of the vehicle. An aperture 40 is formed through an outer surface of the mirror casing 12, and the ambient light sensor 38 is disposed within the mirror head at a position that corresponds with the aperture 40. The ambient light sensor 38 senses light that passes through the aperture 40. The mirror casing 12 may include a light cone 42 that extends between the aperture 40 and the ambient light sensor 38 for directing light toward the ambient light sensor 38. For example, the ambient light sensor 38 is disposed at a PCB within the mirror head and facing away from the mirror reflective element 14. Structure of the mirror casing 12 extends between the aperture 40 and the PCB to provide the light cone 42, with the inner end of the light cone 42 attached at the PCB via the adhesive element 44 that circumscribes the ambient light sensor 38 to locate the ambient light sensor 38 relative to the aperture 40. Optionally, a cover element 46 is disposed over the aperture 40 for hiding the aperture 40 and allows light to pass through the cover element 46 to be sensed by the ambient light sensor 38, and/or a light guide 50 is disposed at the aperture 40 for directing light toward the ambient light sensor 38.

The system may utilize aspects of driver monitoring systems and/or head and face direction and position tracking systems and/or eye tracking systems and/or gesture recognition systems. Such head and face direction and/or position tracking systems and/or eye tracking systems and/or gesture recognition systems may utilize aspects of the systems described in U.S. Pat. Nos. 11,518,401; 10,958,830; 10,065,574; 10,017,114; 9,405,120 and/or 7,914,187, and/or U.S. Publication Nos. US-2022-0377219; US-2022-0254132; US-2022-0242438; US-2021-0323473; US-2021-0291739; US-2020-0320320; US-2020-0202151; US-2020-0143560; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or International Publication Nos. WO 2023/220222; WO 2023/034956; WO 2022/241423 and/or WO 2022/187805, which are hereby incorporated herein by reference in their entireties.

Optionally, the driver monitoring system may be integrated with a camera monitoring system (CMS) of the vehicle. The integrated vehicle system incorporates multiple inputs, such as from the inward viewing or driver monitoring camera and from the forward or outward viewing camera, as well as from a rearward viewing camera and sideward viewing cameras of the CMS, to provide the driver with unique collision mitigation capabilities based on full vehicle environment and driver awareness state. The image processing and detections and determinations are performed locally within the interior rearview mirror assembly and/or the overhead console region, depending on available space and electrical connections for the particular vehicle application. The CMS cameras and system may utilize aspects of the systems described in U.S. Pat. No. 11,242,008 and/or U.S. Publication Nos. US-2021-0162926; US-2021-0155167; US-2018-0134217 and/or US-2014-0285666, and/or International PCT Publication No. WO 2022/150826, which are all hereby incorporated herein by reference in their entireties.

The ECU may receive image data captured by a plurality of cameras of the vehicle, such as by a plurality of surround view system (SVS) cameras and a plurality of camera monitoring system (CMS) cameras and optionally one or more driver monitoring system (DMS) cameras. The ECU may comprise a central or single ECU that processes image data captured by the cameras for a plurality of driving assist functions and may provide display of different video images to a video display screen in the vehicle (such as at an interior rearview mirror assembly or at a central console or the like) for viewing by a driver of the vehicle. The system may utilize aspects of the systems described in U.S. Pat. Nos. 11,242,008; 10,442,360 and/or 10,046,706, and/or U.S. Publication Nos. US-2021-0155167 and/or US-2019-0118717, and/or U.S. Publication No. US-2021-0162926 and/or International PCT Publication No. WO 2022/150826, which are all hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, and/or U.S. Publication Nos. US-2020-0039447; US-2015-0327398; US-2015-0015713; US-2014-0160284; US-2014-0226012 and/or US-2009-0295181, which are all hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

The mirror assembly may comprise an electro-optic or electrochromic mirror assembly that includes an electro-optic or electrochromic variably reflective mirror reflective element. The perimeter edges of the reflective element may be encased or encompassed by the perimeter element or portion of the bezel portion to conceal and contain and envelop the perimeter edges of the substrates and the perimeter seal disposed therebetween. The variably reflective mirror reflective element of the mirror assembly may utilize aspects of the mirror reflective elements described in commonly assigned U.S. Pat. Nos. 7,626,749; 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,115,346; 5,724,187; 5,668,663; 5,910,854; 5,142,407 and/or 4,712,879, and/or U.S. Publication No. US-2022-0371513, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driver monitoring system, the vehicular driver monitoring system comprising:

an interior rearview mirror assembly comprising a mirror head adjustable about a mounting structure, wherein the mounting structure is configured to attach at an interior portion of a cabin of a vehicle equipped with the vehicular driver monitoring system;

wherein the mirror head accommodates a mirror reflective element;

wherein the mirror reflective element comprises a glass substrate and a mirror reflector disposed at the glass substrate;

a driver monitoring camera accommodated by the mirror head, wherein, with the mounting structure attached at the interior portion of the cabin of the vehicle, the driver monitoring camera views within the cabin of the vehicle;

a video mirror display screen accommodated by the mirror head, wherein, with the mounting structure attached at the interior portion of the cabin of the vehicle, the video mirror display screen, when electrically operated, displays video images that are viewable through the mirror reflective element by a driver of the vehicle;

wherein the driver monitoring camera, the video mirror display screen and the mirror reflective element move together and in tandem with the mirror head when, with the mounting structure attached at the interior portion of the cabin of the vehicle, the mirror head is adjusted about the mounting structure to provide a rearward view for the driver of the vehicle provided by the mirror reflective element;

wherein, with the mounting structure attached at the interior portion of the cabin of the vehicle, the video mirror display screen is operable to display video images derived from image data captured by at least one rearward-viewing camera of the vehicle;

wherein the at least one rearward-viewing camera views a scene at least rearward of the vehicle, and wherein the video mirror display screen is operable to display as video images a portion of the scene viewed by the at least one rearward-viewing camera;

an electronic control unit (ECU);

wherein image data captured by the driver monitoring camera is transferred to the ECU;

wherein the ECU comprises electronic circuitry and associated software, and wherein the electronic circuitry of the ECU comprises an image processor operable to process image data transferred to the ECU;

a sensing device that generates sensor data representative of an orientation of the mirror head relative to the mounting structure;

wherein the vehicular driver monitoring system, based on sensor data generated by the sensing device, determines orientation of the mirror head relative to the mounting structure;

wherein, with the mounting structure attached at the interior portion of the cabin of the vehicle, image data captured by the driver monitoring camera is processed at the ECU for monitoring of the driver of the vehicle, and wherein image processing at the ECU of image data captured by the driver monitoring camera is based at least in part on the determined orientation of the mirror head relative to the mounting structure; and wherein, responsive to adjustment of the mirror head relative to the mounting structure, the portion of the scene viewed by the at least one rearward-viewing camera that is displayed as video images by the video mirror display screen is adjusted based on the determined orientation of the mirror head relative to the mounting structure.

2. The vehicular driver monitoring system of claim 1, wherein the driver monitoring camera views through the mirror reflector of the mirror reflective element.

3. The vehicular driver monitoring system of claim 1, wherein the sensing device comprises a magnetic hall effect sensor and a magnet.

4. The vehicular driver monitoring system of claim 3, wherein the magnetic hall effect sensor and the magnet are at a pivot joint that pivotally attaches the mirror head at the mounting structure.

5. The vehicular driver monitoring system of claim 4, wherein the magnet is disposed at a first pivot element of the pivot joint and the magnetic hall effect sensor is disposed at a second pivot element of the pivot joint.

6. The vehicular driver monitoring system of claim 5, wherein the first pivot element comprises a ball member and the second pivot element comprises a socket element.

7. The vehicular driver monitoring system of claim 5, wherein the mounting structure comprises the first pivot element and the mirror head comprises the second pivot element.

8. The vehicular driver monitoring system of claim 3, wherein the magnetic hall effect sensor is disposed at a first side of a printed circuit board (PCB), and wherein the PCB comprises a second side opposite the first side, and wherein the first side of the PCB faces the magnet and the second side faces the mirror reflective element.

9. The vehicular driver monitoring system of claim 1, wherein the sensing device comprises a potentiometer.

10. The vehicular driver monitoring system of claim 9, wherein the potentiometer comprises an electrically conductive trace disposed at a printed circuit board (PCB) and an electrically conductive wiper element that moves along the electrically conductive trace when the mirror head is adjusted relative to the mounting structure.

11. The vehicular driver monitoring system of claim 10, wherein the PCB and the electrically conductive wiper element are at a pivot joint that pivotally attaches the mirror head at the mounting structure, and wherein the PCB is disposed at a socket element of the pivot joint and the electrically conductive wiper element is disposed at a ball member of the pivot joint.

12. The vehicular driver monitoring system of claim 1, comprising a light emitter accommodated by the mirror head, wherein the light emitter moves together and in tandem with the mirror head when the mirror head is adjusted about the mounting structure, and wherein the light emitter is operable, when electrically powered, to emit near infrared (NIR) light.

13. The vehicular driver monitoring system of claim 12, wherein the light emitter comprises a plurality of near infrared light emitting diodes.

14. The vehicular driver monitoring system of claim 12, wherein the light emitter is disposed within the mirror head and behind the mirror reflective element, and wherein the light emitter, when electrically powered, emits near infrared light that passes through the mirror reflective element.

15. The vehicular driver monitoring system of claim 14, wherein the light emitter, when electrically powered, emits near infrared light that passes through the mirror reflector of the mirror reflective element.

16. The vehicular driver monitoring system of claim 1, wherein the ECU is accommodated by the mirror head.

17. The vehicular driver monitoring system of claim 1, wherein the mounting structure comprises a ball member, and wherein the mirror head comprises a socket element, and wherein the ball member is received by the socket element to form a pivot joint that pivotally attaches the mirror head at the mounting structure.

18. The vehicular driver monitoring system of claim 17, wherein a boss protrudes radially from the ball member, and wherein the boss, with the ball member received by the socket element, is received along a corresponding channel formed along the socket element to limit movement of the mirror head relative to the mounting structure.

19. The vehicular driver monitoring system of claim 1, wherein the mirror head accommodates an ambient light sensor, and wherein, with the mounting structure attached at the interior portion of the cabin of the vehicle, the ambient light sensor captures sensor data representative of an ambient light level within the cabin of the vehicle, and wherein an aperture is formed through a mirror casing of the mirror head, and wherein the ambient light sensor is disposed within the mirror head at the aperture, and wherein the ambient light sensor senses light that passes through the aperture.

20. The vehicular driver monitoring system of claim 19, wherein a light cone is disposed at the aperture to direct light from exterior the mirror head toward the ambient light sensor.

21. The vehicular driver monitoring system of claim 19, wherein a cover element is disposed at the aperture, and wherein the ambient light sensor senses light that passes through the cover element.

22. The vehicular driver monitoring system of claim 19, wherein a light guide is disposed at the aperture, and wherein the ambient light sensor senses light that passes through the light guide.

23. The vehicular driver monitoring system of claim 19, wherein the ambient light sensor is disposed at a printed circuit board (PCB) within the mirror head, and wherein an adhesive ring is disposed at the PCB and circumscribes the ambient light sensor, and wherein the adhesive ring attaches to structure of the mirror head to position the ambient light sensor relative to the aperture.

24. The vehicular driver monitoring system of claim 1, wherein the mirror reflective element comprises an electrochromic mirror reflective element that dims responsive to an electrical current applied to an electrochromic medium of the electrochromic mirror reflective element.

25. The vehicular driver monitoring system of claim 24, wherein a dimming control for controlling dimming of the electrochromic mirror reflective element is accommodated at a printed circuit board (PCB) within the mirror head, and wherein a spring contact electrically conductively connects the PCB and the electrochromic mirror reflective element.

26. The vehicular driver monitoring system of claim 25, wherein the spring contact comprises (i) a first end disposed at the PCB and (ii) a second end disposed at the electrochromic mirror reflective element, and wherein a flange extends from the second end of the spring contact and is at least partially received along an aperture of the electrochromic mirror reflective element.

27. The vehicular driver monitoring system of claim 1, wherein the mirror head comprises a chin portion at a lower edge region of the mirror head, and wherein the driver monitoring camera is at least partially accommodated by the chin portion of the mirror head.

28. The vehicular driver monitoring system of claim 27, wherein the driver monitoring camera does not view through the mirror reflector of the mirror reflective element.

29. The vehicular driver monitoring system of claim 1, wherein the interior portion of the cabin of the vehicle comprises an in-cabin side of a windshield of the vehicle.

30. The vehicular driver monitoring system of claim 1, wherein image data captured by the at least one rearward-viewing camera is transferred to the ECU and is processed at the ECU.

31. A vehicular driver monitoring system, the vehicular driver monitoring system comprising:

an interior rearview mirror assembly comprising a mirror head adjustable about a mounting structure, wherein the mounting structure is configured to attach at an interior portion of a cabin of a vehicle equipped with the vehicular driver monitoring system;

wherein the mounting structure comprises a ball member, and wherein the mirror head comprises a socket element, and wherein the ball member is received by the socket element to form a pivot joint that pivotally attaches the mirror head at the mounting structure;

wherein the mirror head accommodates a mirror reflective element;

wherein the mirror reflective element comprises a glass substrate and a mirror reflector disposed at the glass substrate;

a driver monitoring camera accommodated by the mirror head, wherein, with the mounting structure attached at the interior portion of the cabin of the vehicle, the driver monitoring camera views within the cabin of the vehicle;

a video mirror display screen accommodated by the mirror head, wherein, with the mounting structure attached at the interior portion of the cabin of the vehicle, the video mirror display screen, when electrically operated, displays video images that are viewable through the mirror reflective element by a driver of the vehicle;

wherein the driver monitoring camera, the video mirror display screen and the mirror reflective element move together and in tandem with the mirror head when, with the mounting structure attached at the interior portion of the cabin of the vehicle, the mirror head is adjusted about the mounting structure to provide a rearward view for the driver of the vehicle provided by the mirror reflective element;

wherein, with the mounting structure attached at the interior portion of the cabin of the vehicle, the video mirror display screen is operable to display video images derived from image data captured by at least one rearward-viewing camera of the vehicle;

wherein the at least one rearward-viewing camera views a scene at least rearward of the vehicle, and wherein the video mirror display screen is operable to display as video images a portion of the scene viewed by the at least one rearward-viewing camera;

an electronic control unit (ECU) accommodated by the mirror head;

wherein image data captured by the driver monitoring camera is transferred to the ECU;

wherein the ECU comprises electronic circuitry and associated software, and wherein the electronic circuitry of the ECU comprises an image processor operable to process image data transferred to the ECU;

a magnetic sensing device that comprises a magnetic hall effect sensor and a magnet, wherein the magnetic hall effect sensor and the magnet are at the pivot joint that pivotally attaches the mirror head at the mounting structure, and wherein the magnetic hall effect sensor generates sensor data representative of an orientation of the mirror head relative to the mounting structure;

wherein the vehicular driver monitoring system, based on sensor data generated by the magnetic hall effect sensor, determines orientation of the mirror head relative to the mounting structure;

wherein, with the mounting structure attached at the interior portion of the cabin of the vehicle, image data captured by the driver monitoring camera is processed at the ECU for monitoring of the driver of the vehicle, and wherein image processing at the ECU of image data captured by the driver monitoring camera is based at least in part on the determined orientation of the mirror head relative to the mounting structure; and wherein, responsive to adjustment of the mirror head relative to the mounting structure, the portion of the scene viewed by the at least one rearward-viewing camera that is displayed as video images by the video mirror display screen is adjusted based on the determined orientation of the mirror head relative to the mounting structure.

32. The vehicular driver monitoring system of claim 31, wherein the magnet is disposed at the ball member of the mounting structure and the magnetic hall effect sensor is disposed at the socket element of the mirror head.

33. The vehicular driver monitoring system of claim 31, comprising a light emitter accommodated by the mirror head, wherein the light emitter moves together and in tandem with the mirror head when the mirror head is adjusted about the mounting structure, and wherein the light emitter is operable, when electrically powered, to emit near infrared (NIR) light.

34. The vehicular driver monitoring system of claim 33, wherein the light emitter is disposed within the mirror head and behind the mirror reflective element, and wherein the light emitter, when electrically powered, emits near infrared light that passes through the mirror reflective element.

35. The vehicular driver monitoring system of claim 31, wherein a boss protrudes radially from the ball member, and wherein the boss, with the ball member received by the socket element, is received along a corresponding channel formed along the socket element to limit movement of the mirror head relative to the mounting structure.

36. The vehicular driver monitoring system of claim 31, wherein the interior portion of the cabin of the vehicle comprises an in-cabin side of a windshield of the vehicle.

37. A vehicular driver monitoring system, the vehicular driver monitoring system comprising:

an interior rearview mirror assembly comprising a mirror head adjustable about a mounting structure, wherein the mounting structure is configured to attach at an interior portion of a cabin of a vehicle equipped with the vehicular driver monitoring system;

wherein the mirror head accommodates an ambient light sensor, and wherein, with the mounting structure attached at the interior portion of the cabin of the vehicle, the ambient light sensor captures sensor data representative of an ambient light level within the cabin of the vehicle, and wherein an aperture is formed through a mirror casing of the mirror head, and wherein the ambient light sensor is disposed within the mirror head at the aperture, and wherein the ambient light sensor senses light that passes through the aperture;

wherein the mirror head accommodates a mirror reflective element;

wherein the mirror reflective element comprises a glass substrate and a mirror reflector disposed at the glass substrate, and wherein the mirror reflective element comprises an electrochromic mirror reflective element that dims responsive to an electrical current applied to an electrochromic medium of the electrochromic mirror reflective element;

a driver monitoring camera accommodated by the mirror head, wherein, with the mounting structure attached at the interior portion of the cabin of the vehicle, the driver monitoring camera views within the cabin of the vehicle;

a video mirror display screen accommodated by the mirror head, wherein, with the mounting structure attached at the interior portion of the cabin of the vehicle, the video mirror display screen, when electrically operated, displays video images that are viewable through the mirror reflective element by a driver of the vehicle;

wherein the driver monitoring camera, the video mirror display screen and the mirror reflective element move together and in tandem with the mirror head when, with the mounting structure attached at the interior portion of the cabin of the vehicle, the mirror head is adjusted about the mounting structure to provide a rearward view for the driver of the vehicle provided by the mirror reflective element;

wherein, with the mounting structure attached at the interior portion of the cabin of the vehicle, the video mirror display screen is operable to display video images derived from image data captured by at least one rearward-viewing camera of the vehicle;

wherein the at least one rearward-viewing camera views a scene at least rearward of the vehicle, and wherein the video mirror display screen is operable to display as video images a portion of the scene viewed by the at least one rearward-viewing camera;

an electronic control unit (ECU) accommodated by the mirror head;

wherein image data captured by the driver monitoring camera is transferred to the ECU;

wherein the ECU comprises electronic circuitry and associated software, and wherein the electronic circuitry of the ECU comprises an image processor operable to process image data transferred to the ECU;

a sensing device that generates sensor data representative of an orientation of the mirror head relative to the mounting structure;

wherein the vehicular driver monitoring system, based on sensor data generated by the sensing device, determines orientation of the mirror head relative to the mounting structure;

wherein, with the mounting structure attached at the interior portion of the cabin of the vehicle, image data captured by the driver monitoring camera is processed at the ECU for monitoring of the driver of the vehicle, and wherein image processing at the ECU of image data captured by the driver monitoring camera is based at least in part on the determined orientation of the mirror head relative to the mounting structure; and wherein, responsive to adjustment of the mirror head relative to the mounting structure, the portion of the scene viewed by the at least one rearward-viewing camera that is displayed as video images by the video mirror display screen is adjusted based on the determined orientation of the mirror head relative to the mounting structure.

38. The vehicular driver monitoring system of claim 37, wherein the sensing device comprises a magnetic hall effect sensor and a magnet, and wherein the magnetic hall effect sensor is disposed at a first side of a printed circuit board (PCB), and wherein the PCB comprises a second side opposite the first side, and wherein the first side of the PCB faces the magnet and the second side faces the mirror reflective element.

39. The vehicular driver monitoring system of claim 37, wherein the sensing device comprises a potentiometer, and wherein the potentiometer comprises an electrically conductive trace disposed at a printed circuit board (PCB) and an electrically conductive wiper element that moves along the electrically conductive trace when the mirror head is adjusted relative to the mounting structure.

40. The vehicular driver monitoring system of claim 37, comprising a light emitter accommodated by the mirror head, wherein the light emitter moves together and in tandem with the mirror head when the mirror head is adjusted about the mounting structure, and wherein the light emitter is operable, when electrically powered, to emit near infrared (NIR) light.

41. The vehicular driver monitoring system of claim 37, wherein the mounting structure comprises a ball member, and wherein the mirror head comprises a socket element, and wherein the ball member is received by the socket element to form a pivot joint that pivotally attaches the mirror head at the mounting structure.

42. The vehicular driver monitoring system of claim 41, wherein a boss protrudes radially from the ball member, and wherein the boss, with the ball member received by the socket element, is received along a corresponding channel formed along the socket element to limit movement of the mirror head relative to the mounting structure.

43. The vehicular driver monitoring system of claim 37, wherein a light cone is disposed at the aperture to direct light from exterior the mirror head toward the ambient light sensor.

44. The vehicular driver monitoring system of claim 37, wherein a cover element is disposed at the aperture, and wherein the ambient light sensor senses light that passes through the cover element.

45. The vehicular driver monitoring system of claim 37, wherein a light guide is disposed at the aperture, and wherein the ambient light sensor senses light that passes through the light guide.

46. The vehicular driver monitoring system of claim 37, wherein the ambient light sensor is disposed at a printed circuit board (PCB) within the mirror head, and wherein an adhesive ring is disposed at the PCB and circumscribes the ambient light sensor, and wherein the adhesive ring attaches to structure of the mirror head to position the ambient light sensor relative to the aperture.

47. The vehicular driver monitoring system of claim 37, wherein the interior portion of the cabin of the vehicle comprises an in-cabin side of a windshield of the vehicle.

* * * * *